(12) United States Patent
Ahuja et al.

(10) Patent No.: US 8,667,121 B2
(45) Date of Patent: Mar. 4, 2014

(54) SYSTEM AND METHOD FOR MANAGING DATA AND POLICIES

(75) Inventors: Ratinder Paul Singh Ahuja, Saratoga, CA (US); Joel Christener, San Jose, CA (US); Jitendra Gaitonde, Cupertino, CA (US); Sirisha Ganti, Sunnyvale, CA (US); Sridevi Haridasa, San Jose, CA (US); Damodar K. Hegde, Cupertino, CA (US); Chaitra Jayaram, Sunnyvale, CA (US); Rahila Kasim, Santa Clara, CA (US); Faizel Lakhani, Campbell, CA (US); Swati Patil, Sunnyvale, CA (US); Harsimran S. Sandhu, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 686 days.

(21) Appl. No.: 12/410,905

(22) Filed: Mar. 25, 2009

(65) Prior Publication Data

US 2013/0246925 A1    Sep. 19, 2013

(51) Int. Cl.
*G06F 15/173* (2006.01)
*G06F 15/177* (2006.01)

(52) U.S. Cl.
USPC .......................................... 709/224; 715/736

(58) Field of Classification Search
USPC ............... 709/224; 726/1, 13, 22; 715/736
See application file for complete search history.

(56) References Cited

U.S. PATENT DOCUMENTS

| 4,286,255 | A | 8/1981 | Siy |
| 4,710,957 | A | 12/1987 | Bocci et al. |
| 5,249,289 | A | 9/1993 | Thamm et al. |
| 5,465,299 | A | 11/1995 | Matsumoto et al. |
| 5,479,654 | A | 12/1995 | Squibb |

(Continued)

FOREIGN PATENT DOCUMENTS

| EP | 2499806 | 9/2012 |
| WO | WO 2004/008310 | 1/2004 |
| WO | WO 2012/060892 | 5/2012 |

OTHER PUBLICATIONS

U.S. Appl. No. 12/690,153, filed Jan. 20, 2010, entitled "Query Generation for a Capture System," Inventor(s) Erik de la Iglesia, et al.

(Continued)

*Primary Examiner* — Douglas Blair
*Assistant Examiner* — Benjamin Ailes
(74) *Attorney, Agent, or Firm* — Patent Capital Group

(57) ABSTRACT

In one embodiment, a method is provided and includes capturing a plurality of packet streams, recreating a plurality of flows from the packet streams, and analyzing the flows to identify one or more incidents. The incidents identify one or more pieces of data. The incidents are filtered and the incidents are rendered on a display for an end user that initiated the filtering operation. In other embodiments, the display allows the end user to view a selected one of a group of attributes for the incidents. The display allows the end user to open a captured object associated with a specific incident. In still other embodiments, the display allows a user to filter the incidents using a selected one of a group of group options such as content, destination IP, destination location, destination port, filename, host IP, etc.

24 Claims, 33 Drawing Sheets

(56) References Cited

U.S. PATENT DOCUMENTS

| | | |
|---|---|---|
| 5,497,489 A | 3/1996 | Menne |
| 5,542,090 A | 7/1996 | Henderson et al. |
| 5,557,747 A | 9/1996 | Rogers et al. |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,181,769 B1 * | 2/2007 | Keanini et al. ............... 726/23 |
| 7,185,073 B1 | 2/2007 | Gai et al. |
| 7,185,192 B1 | 2/2007 | Kahn |
| 7,194,483 B1 | 3/2007 | Mohan et al. |
| 7,219,131 B2 | 5/2007 | Banister |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 * | 11/2007 | Brook et al. ............... 715/736 |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 * | 11/2007 | Branigan et al. ............... 726/2 |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 * | 3/2009 | Schuba et al. ............... 370/392 |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,664,083 B1 | 2/2010 | Cermak et al. |
| 7,685,254 B2 | 3/2010 | Pandya |
| 7,730,011 B1 | 6/2010 | Deninger et al. |
| 7,739,080 B1 | 6/2010 | Beck et al. |
| 7,760,730 B2 * | 7/2010 | Goldschmidt et al. ......... 370/392 |
| 7,760,769 B1 * | 7/2010 | Lovett et al. ............... 370/542 |
| 7,774,604 B2 | 8/2010 | Lowe et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 | 12/2010 | Kamani et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,926,099 B1 * | 4/2011 | Chakravarty et al. ............ 726/13 |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,979,524 B2 * | 7/2011 | Dieberger et al. ............ 709/223 |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,055,601 B2 | 11/2011 | Pandya |
| 8,056,130 B1 * | 11/2011 | Njemanze et al. ............... 726/22 |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,205,244 B2 * | 6/2012 | Nightingale et al. ............... 726/3 |
| 8,261,347 B2 * | 9/2012 | Hrabik et al. ............... 726/22 |
| 8,271,794 B2 | 9/2012 | Lowe et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |

(56) References Cited

U.S. PATENT DOCUMENTS

| | | |
|---|---|---|
| 8,463,800 B2 | 6/2013 | Deninger et al. |
| 8,473,442 B1 | 6/2013 | Deninger et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0105854 A1 | 6/2003 | Thorsteinsson et al. |
| 2003/0131116 A1 | 7/2003 | Jain et al. |
| 2003/0135612 A1 | 7/2003 | Huntington |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0071164 A1 | 4/2004 | Baum |
| 2004/0111406 A1 | 6/2004 | Udeshi et al. |
| 2004/0111678 A1 | 6/2004 | Hara et al. |
| 2004/0114518 A1 | 6/2004 | McFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139120 A1 | 7/2004 | Clark et al. |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215612 A1 | 10/2004 | Brody |
| 2004/0220944 A1 | 11/2004 | Behrens et al. |
| 2004/0230572 A1 | 11/2004 | Omoigui |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1* | 2/2007 | Gupta et al. .................. 711/108 |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1* | 4/2007 | Talley et al. .................. 370/252 |
| 2007/0094394 A1 | 4/2007 | Singh et al. |
| 2007/0106660 A1 | 5/2007 | Stern et al. |

(56) References Cited

U.S. PATENT DOCUMENTS

| | | | |
|---|---|---|---|
| 2007/0106685 A1 | 5/2007 | Houh et al. | |
| 2007/0106693 A1 | 5/2007 | Houh et al. | |
| 2007/0110089 A1 | 5/2007 | Essafi et al. | |
| 2007/0112837 A1 | 5/2007 | Houh et al. | |
| 2007/0112838 A1 | 5/2007 | Bjarnestam et al. | |
| 2007/0116366 A1 | 5/2007 | Deninger et al. | |
| 2007/0124384 A1 | 5/2007 | Howell et al. | |
| 2007/0136599 A1 | 6/2007 | Suga | |
| 2007/0140128 A1 | 6/2007 | Klinker et al. | |
| 2007/0143559 A1 | 6/2007 | Yagawa | |
| 2007/0162609 A1 | 7/2007 | Pope et al. | |
| 2007/0220607 A1 | 9/2007 | Sprosts et al. | |
| 2007/0226504 A1 | 9/2007 | de la Iglesia et al. | |
| 2007/0226510 A1 | 9/2007 | de la Iglesia et al. | |
| 2007/0248029 A1 | 10/2007 | Merkey et al. | |
| 2007/0271254 A1 | 11/2007 | de la Iglesia et al. | |
| 2007/0271371 A1 | 11/2007 | Ahuja et al. | |
| 2007/0271372 A1 | 11/2007 | Deninger et al. | |
| 2007/0280123 A1 | 12/2007 | Atkins et al. | |
| 2008/0027971 A1 | 1/2008 | Statchuk | |
| 2008/0028467 A1 | 1/2008 | Kommareddy et al. | |
| 2008/0030383 A1 | 2/2008 | Cameron | |
| 2008/0082497 A1 | 4/2008 | Leblang et al. | |
| 2008/0091408 A1 | 4/2008 | Roulland et al. | |
| 2008/0112411 A1 | 5/2008 | Stafford et al. | |
| 2008/0115125 A1 | 5/2008 | Stafford et al. | |
| 2008/0140657 A1 | 6/2008 | Azvine et al. | |
| 2008/0141117 A1 | 6/2008 | King et al. | |
| 2008/0159627 A1 | 7/2008 | Sengamedu | |
| 2008/0235163 A1 | 9/2008 | Balasubramanian et al. | |
| 2008/0263019 A1 | 10/2008 | Harrison et al. | |
| 2008/0270462 A1 | 10/2008 | Thomsen | |
| 2008/0276295 A1* | 11/2008 | Nair | 726/1 |
| 2009/0070327 A1 | 3/2009 | Loeser et al. | |
| 2009/0070328 A1 | 3/2009 | Loeser et al. | |
| 2009/0070459 A1 | 3/2009 | Cho et al. | |
| 2009/0100055 A1 | 4/2009 | Wang | |
| 2009/0157659 A1 | 6/2009 | Satoh et al. | |
| 2009/0178110 A1* | 7/2009 | Higuchi | 726/1 |
| 2009/0187568 A1* | 7/2009 | Morin | 707/6 |
| 2009/0216752 A1 | 8/2009 | Terui et al. | |
| 2009/0222442 A1 | 9/2009 | Houh et al. | |
| 2009/0235150 A1 | 9/2009 | Berry | |
| 2009/0254532 A1 | 10/2009 | Yang et al. | |
| 2009/0288164 A1 | 11/2009 | Adelstein et al. | |
| 2009/0300709 A1 | 12/2009 | Chen et al. | |
| 2009/0326925 A1 | 12/2009 | Crider et al. | |
| 2010/0011016 A1 | 1/2010 | Greene | |
| 2010/0011410 A1 | 1/2010 | Liu | |
| 2010/0037324 A1 | 2/2010 | Grant et al. | |
| 2010/0088317 A1 | 4/2010 | Bone et al. | |
| 2010/0100551 A1 | 4/2010 | Knauft et al. | |
| 2010/0121853 A1 | 5/2010 | de la Iglesia et al. | |
| 2010/0174528 A1 | 7/2010 | Oya et al. | |
| 2010/0185622 A1 | 7/2010 | Deninger et al. | |
| 2010/0191732 A1 | 7/2010 | Lowe et al. | |
| 2010/0195909 A1 | 8/2010 | Wasson et al. | |
| 2010/0268959 A1 | 10/2010 | Lowe et al. | |
| 2010/0332502 A1 | 12/2010 | Carmel et al. | |
| 2011/0004599 A1 | 1/2011 | Deninger et al. | |
| 2011/0040552 A1 | 2/2011 | Van Guilder et al. | |
| 2011/0131199 A1 | 6/2011 | Simon et al. | |
| 2011/0149959 A1 | 6/2011 | Liu et al. | |
| 2011/0167212 A1 | 7/2011 | Lowe et al. | |
| 2011/0167265 A1 | 7/2011 | Ahuja et al. | |
| 2011/0196911 A1 | 8/2011 | de la Iglesia et al. | |
| 2011/0197284 A1 | 8/2011 | Ahuja et al. | |
| 2011/0208861 A1 | 8/2011 | Deninger et al. | |
| 2011/0219237 A1 | 9/2011 | Ahuja et al. | |
| 2011/0258197 A1 | 10/2011 | de la Iglesia et al. | |
| 2011/0276575 A1 | 11/2011 | de la Iglesia et al. | |
| 2011/0276709 A1 | 11/2011 | Deninger et al. | |
| 2012/0114119 A1 | 5/2012 | Ahuja et al. | |
| 2012/0179687 A1 | 7/2012 | Liu | |
| 2012/0180137 A1 | 7/2012 | Liu | |
| 2012/0191722 A1 | 7/2012 | Deninger et al. | |

OTHER PUBLICATIONS

Preneel, Bart, "Cryptographic Hash Functions", Proceedings of the $3^{rd}$ Symposium on State and Progress of Research in Cryptography, 1993, pp. 161-171.

Microsoft Outlook, Out look, copyright 1995-2000, 2 pages.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.

U.S. Appl. No. 12/873,061, filed Aug. 31, 2010, entitled "Document Registration," Inventor(s) Ratinder Paul Singh Ahuja, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al.

U.S. Appl. No. 13/047,068, filed Mar. 14, 2011, entitled "Cryptographic Policy Enforcement," Inventor(s) Ratinder Paul Singh Ahuja, et al.

U.S. Appl. No. 13/024,923, filed Feb. 10, 2011, entitled "High Speed Packet Capture," Inventor(s) Weimin Liu, et al.

Han, OLAP Mining: An Integration of OLAP with Data Mining, Oct. 1997, pp. 1-18.

International Search Report and Written Opinion and Declaration of Non-Establishment of International Search Report for International Application No. PCT/US2011/024902 mailed Aug. 1, 2011 (8 pages).

Niemi, Constructing OLAP Cubes Based on Queries, Nov. 2001, pp. 1-7.

Schultz, Data Mining for Detection of New Malicious Executables, May 2001, pp. 1-13.

U.S. Appl. No. 13/099,516, filed May 3, 2011, entitled "Object Classification in a Capture System," Inventor(s) William Deninger, et al.

U.S. Appl. No. 13/168,739, filed Jun. 24, 2011, entitled "Method and Apparatus for Data Capture and Analysis System," Inventor(s) Erik de la Iglesia, et al.

U.S. Appl. No. 13/187,421, filed Jul. 20, 2011, entitled "Query Generation for a Capture System," Inventor(s) Erik de la Iglesia, et al.

(56) References Cited

OTHER PUBLICATIONS

U.S. Appl. No. 13/188,441, filed Jul. 21, 2011, entitled "Locational Tagging in a Capture System," Inventor(s) William Deninger et al.
U.S. Appl. No. 13/422,791, filed Mar. 16, 2012, entitled "System and Method for Data Mining and Security Policy Management", Inventor, Weimin Liu.
U.S. Appl. No. 13/424,249, filed Mar. 19, 2012, entitled "System and Method for Data Mining and Security Policy Management", Inventor, Weimin Liu.
U.S. Appl. No. 13/431,678, filed Mar. 27, 2012, entitled "Attributes of Captured Objects in a Capture System", Inventors William Deninger, et al.
U.S. Appl. No. 13/436,275, filed Mar. 30, 2012, entitled "System and Method for Intelligent State Management", Inventors William Deninger, et al.
U.S. Appl. No. 13/337,737, filed Dec. 27, 2011, entitled "System and Method for Providing Data Protection Workflows in a Network Environment", Inventor(s) Ratinder Paul Singh Ahuja, et al.
U.S. Appl. No. 13/338,060, filed Dec. 27, 2011, entitled "System and Method for Providing Data Protection Workflows in a Network Environment", Inventor(s) Ratinder Paul Singh Ahuja, et al.
U.S. Appl. No. 13/338,159, filed Dec. 27, 2011, entitled "System and Method for Providing Data Protection Workflows in a Network Environment", Inventor(s) Ratinder Paul Singh Ahuja, et al.
U.S. Appl. No. 13/338,195, filed Dec. 27, 2011, entitled "System and Method for Providing Data Protection Workflows in a Network Environment", Inventor(s) Ratinder Paul Singh Ahuja, et al.
Mao et al. "MOT: Memory Online Tracing of Web Information System," Proceedings of the Second International Conference on Web Information Systems Engineering (WISE '01); pp. 271-277, (IEEE0-0-7695-1393-X/02) Aug. 7, 2002 (7 pages).
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany.
Walter Allasia et al., Indexing and Retrieval of Multimedia Metadata on a Secure DHT, University of Torino, Italy, Department of Computer Science, Aug. 31, 2008, 16 pages.
International Preliminary Report on Patentability Written Opinion of the International Searching Authority for International Application No. PCT/US2011/024902 dated May 7, 2013 (5 pages).
U.S. Appl. No. 13/896,210, filed May 16, 2013, entitled "System and Method for Data Mining and Security Policy Management" Inventor(s) Ratinder Paul Singh Ahuja et al.

* cited by examiner

| Policy Name | Description | State | Owner | Last Modified | Deployed On |
|---|---|---|---|---|---|
| Acceptable Use | Acceptable Use | Active | admin | Thu Nov 1 22:02:07 PDT | bee-155.hukkanet.com |
| Competitive Edge | Competitive Edge | Active | admin | Thu Nov 1 22:02:07 PDT | bee-155.hukkanet.com |
| Entertainment Industry Knowledge Protection | Intellectual Property and Competitive Communication Tracker | Active | admin | Thu Nov 1 22:02:07 PDT | bee-155.hukkanet.com |
| FERPA Compliance | Family Education Rights and Privacy Act | Active | admin | Thu Nov 1 22:02:07 PDT | bee-155.hukkanet.com |
| GLBA Compliance | Gramm-Leach-Billey Act | Active | admin | Thu Nov 1 22:02:07 PDT | bee-155.hukkanet.com |
| High Tech Industry Knowledge Protector | Intellectual Property and Competitive Communication Tracker | Active | admin | Thu Nov 1 22:02:07 PDT | bee-155.hukkanet.com |
| HIPAA Compliance | Health Insurance Portability and Accountability Act | Active | admin | Thu Nov 1 22:02:07 PDT | bee-155.hukkanet.com |
| Human Resources | Human Resources | Active | admin | Thu Nov 1 22:02:07 PDT | bee-155.hukkanet.com |

FIG. 10A

SYSTEM AND METHOD FOR MANAGING DATA AND POLICIES

TECHNICAL FIELD OF THE INVENTION

The present invention relates to computer networks and, more particularly, to a system and a method for managing data and policies.

BACKGROUND OF THE INVENTION

Computer networks have become indispensable tools for modern business. Enterprises can use networks for communications and, further, can store data in various forms and at various locations. Critical information frequently propagates over a network of a business enterprise. Modern enterprises employ numerous tools to control the dissemination of such information and many of these tools attempt to keep outsiders, intruders, and unauthorized personnel from accessing valuable or sensitive information. Commonly, these tools can include firewalls, intrusion detection systems, and packet sniffer devices.

The ability to offer a system or a protocol that offers an effective data management system, capable of securing and controlling the movement of important information, provides a significant challenge to security professionals, component manufacturers, service providers, and system administrators alike.

BRIEF DESCRIPTION OF THE DRAWINGS

The present invention is illustrated by way of example, and not by way of limitation, in the figures of the accompanying drawings in which like reference numerals refer to similar elements and in which:

FIG. 10A illustrates one embodiment of the presentation of a policies view;

DETAILED DESCRIPTION OF EXAMPLE EMBODIMENTS

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Figure 1:
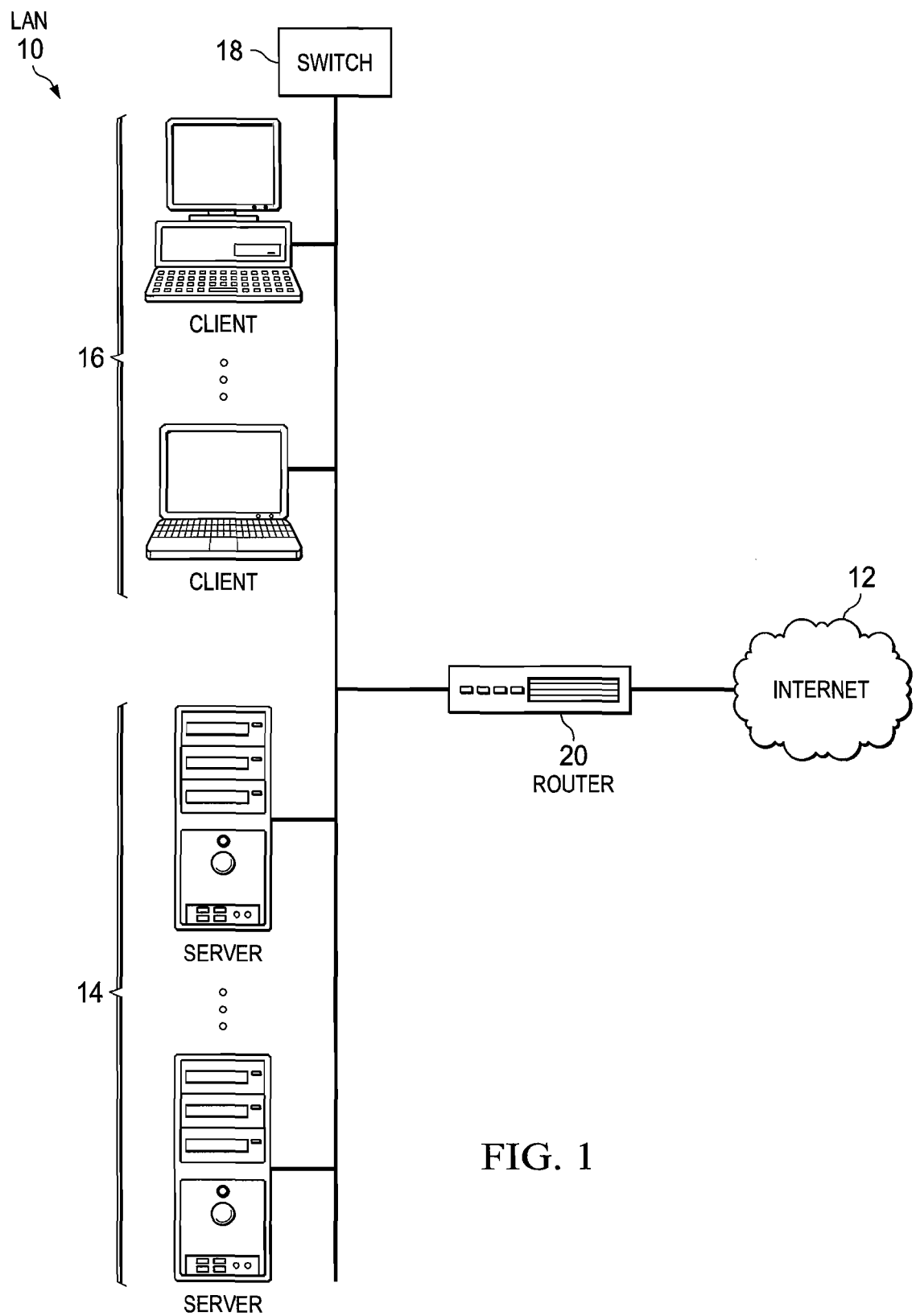
FIG. 1 is a block diagram illustrating a computer network connected to the Internet.

FIG. 1 illustrates a simple prior art configuration of a local area network (LAN) 10 connected to an Internet 12. Connected to the LAN 10 are various components, such as servers 14, clients 16, and a switch 18. Numerous other known networking components and computing devices can be connected to LAN 10. LAN 10 can be implemented using various wireline or wireless technologies, such as Ethernet and 802.11B. LAN 10 is connected to Internet 12 via a router 20. Router 20 can be used to implement a firewall, which can be used to give users of LAN 10 secure access to Internet 12, as well as to separate a company's public Web server (can be one of servers 14) from its internal network, i.e., LAN 10. In one embodiment, any data leaving the LAN 10 towards the Internet 12 passes through router 20. However, router 20 merely forwards packets to Internet 12. Router 20 cannot capture, analyse, and searchably store the content contained in the forwarded packets.

Figure 2:
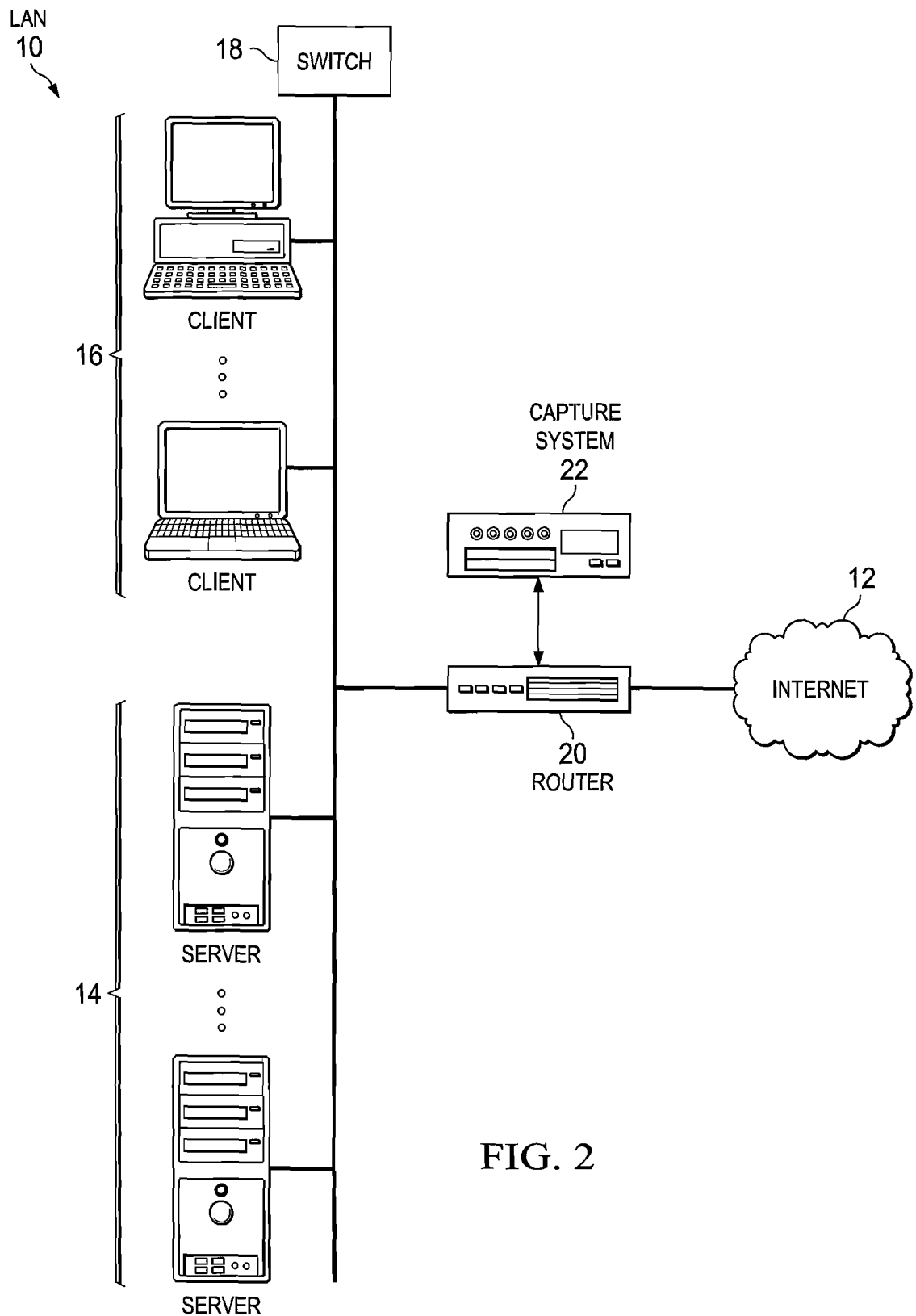
FIG. 2 is a block diagram illustrating one configuration of a capture system according to one embodiment of the present invention.

One embodiment of the present invention is now illustrated with reference to FIG. 2. FIG. 2 shows a simplified configuration of connecting LAN 10 to Internet 12 via router 20. However, in FIG. 2, router 20 is also connected to a capture system 22. In one embodiment, router 20 splits the outgoing data stream and forwards one copy to Internet 12 and the other copy to capture system 22.

There are various other possible configurations. For example, router 20 can also forward a copy of all incoming data to capture system 22 as well. Furthermore, capture system 22 can be configured sequentially in front of, or behind router 20, however this makes capture system 22 a critical component in connecting to Internet 12. In systems where router 20 is not used, the capture system can be interposed directly between LAN 10 and Internet 12. In one embodiment, capture system 22 has a user interface accessible from a LAN-attached device, such as one of clients 16.

In one embodiment, capture system 22 intercepts all data leaving the network. In other embodiments, the capture system can also intercept all data being communicated inside the network. In one embodiment, capture system 22 reconstructs the documents leaving the network and stores them in a searchable fashion. Capture system 22 can then be used to search and sort through all documents that have left the network. There are many reasons such documents may be of interest, including network security reasons, intellectual property concerns, corporate governance regulations, and other corporate policy concerns.

Figure 3:
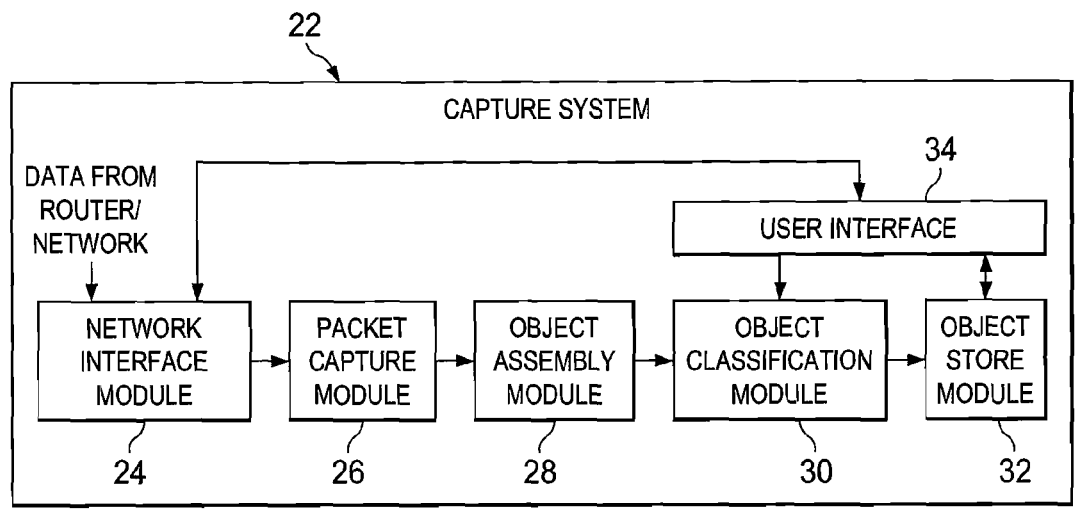
FIG. 3 is a block diagram illustrating the capture system according to one embodiment of the present invention.

One embodiment of the present invention is now described with reference to FIG. 3. FIG. 3 shows one embodiment of capture system 22 in more detail. Capture system 22 includes a network interface module 24 to receive data from the network or router 20. In one embodiment, network interface module 24 is implemented using one or more network interface cards (NIC), e.g., Ethernet cards. In one embodiment, router 20 delivers data (leaving the network) to network interface module 24. The captured raw data is then passed to a packet capture module 26. In one embodiment, packet capture module 26 extracts data packets from the data stream received from network interface module 24. In one embodiment, packet capture module 26 reconstructs Ethernet packets from multiple sources to multiple destinations for the raw data stream. In one embodiment, the packets are then provided to an object assembly module 28. Object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. Object assembly module 28 can reconstruct the document from the captured packets. FIG. 3 also depicts an object store module 32, which can be coupled to a user interface 34.

Figure 4:
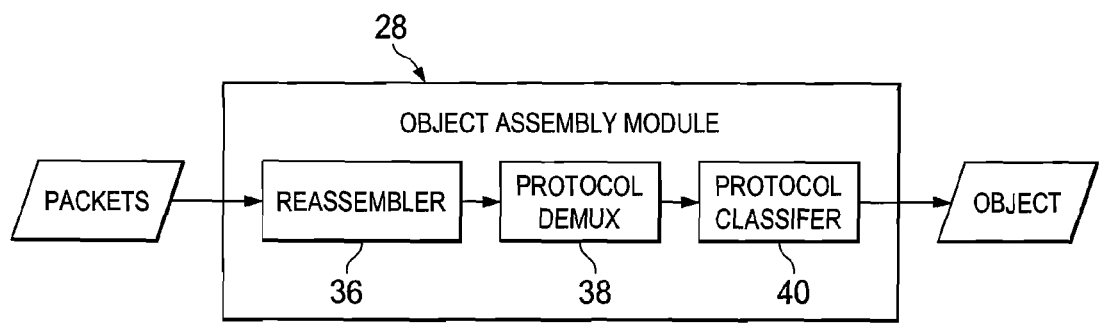
FIG. 4 is a block diagram illustrating an object assembly module according to one embodiment of the present invention.

One embodiment of object assembly module 28 is now described in more detail with reference to FIG. 4. When packets first enter the object assembly module, they are first provided to a reassembler 36. In one embodiment, reassembler 36 groups (e.g., assembles) the packets into unique flows. For example, a flow can be defined as packets with identical Source IP and Destination IP addresses as well as identical TCP Source and Destination Ports. That is, reassembler 36 can organize a packet stream by sender and recipient.

In one embodiment, reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If it is observed that reassembler 36 is finishing within some time constraint, it can terminate the flow via a timeout mechanism. In an embodiment using the TPC protocol, a TCP flow contains an ordered sequence of packets that can be assembled into a contiguous data stream by reassembler 36. Thus, in one embodiment, a flow is an ordered data stream of a single communication between a source and a destination.

The flow assembled by reassembler 36 can then be provided to a protocol demultiplexer (demux) 38. In one embodiment, protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus, in one embodiment, protocol demux 38 separates all the different protocols in one flow.

In one embodiment, a protocol classifier 40 also sorts the flows in addition to protocol demux 38. In one embodiment, protocol classifier 40 (operating in either parallel or in sequence with protocol demux 38) can apply signature filters to the flows to attempt to identify the protocol based solely on the transported data. Furthermore, protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), protocol classifier 40 would use protocol signatures, e.g., the characteristic data sequences of defined protocols, to verify the speculative classification performed by protocol demux 38.

In one embodiment, object assembly module 28 outputs each flow organized by protocol, which represent the underlying objects. Referring again to FIG. 3, these objects can then be handed over to object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by object classification module 30.

Object classification module 30 uses the inherent properties and signatures of various documents to determine the content type of each object. For example, a Word document has a signature that is distinct from a PowerPoint document, or an Email document. Object classification module 30 can extract out each individual object and sort them out by such content types. Such classification renders the present invention immune from cases where a malicious user has altered a file extension or other property in an attempt to avoid detection of illicit activity.

In one embodiment, object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means.

In one embodiment, the capture rules are authored by users of capture system 22. Capture system 22 is made accessible to any network-connected machine through network interface module 24 and user interface 34. In one embodiment, user interface 34 is a graphical user interface providing the user with friendly access to the various features of capture system 22. For example, user interface 34 can provide a capture rule authoring tool that allows users to write and implement any capture rule desired, which are then applied by object classification module 30 when determining whether each object should be stored. User interface 34 can also provide preconfigured capture rules that the user can select from along with an explanation of the operation of such standard included capture rules. In one embodiment, the default capture rule implemented by object classification module 30 captures all objects leaving the network 10. If the capture of an object is mandated by the capture rules, object classification module 30 can also determine where in object store module 32 the captured object should be stored.

In alternative embodiments, instead of being implemented in conjunction with (or included within) a router, capture system 22 may be included as part of other network appliances such as switches, gateways, bridges, loadbalancers, servers, or any other suitable device, component, element, or object operable to exchange information in a network environment. Moreover, these network appliances and/or capture systems may include any suitable hardware, software, components, modules, interfaces, or objects that facilitate the operations thereof. This may be inclusive of appropriate algorithms and communication protocols that facilitate the data mining and policy management operations detailed herein.

One or more tables may be included in these network appliances (or within capture system 22). In other embodiments, these tables may be provided externally to these elements, or consolidated in any suitable fashion. The tables are memory elements for storing information to be referenced by their corresponding network appliances. As used herein in this document, the term 'table' is inclusive of any suitable database or storage medium (provided in any appropriate format) that is capable of maintaining information pertinent to the operations detailed herein in this Specification. For example, the tables may store information in an electronic register, diagram, record, index, list, or queue. Alternatively, the tables may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Figure 5:
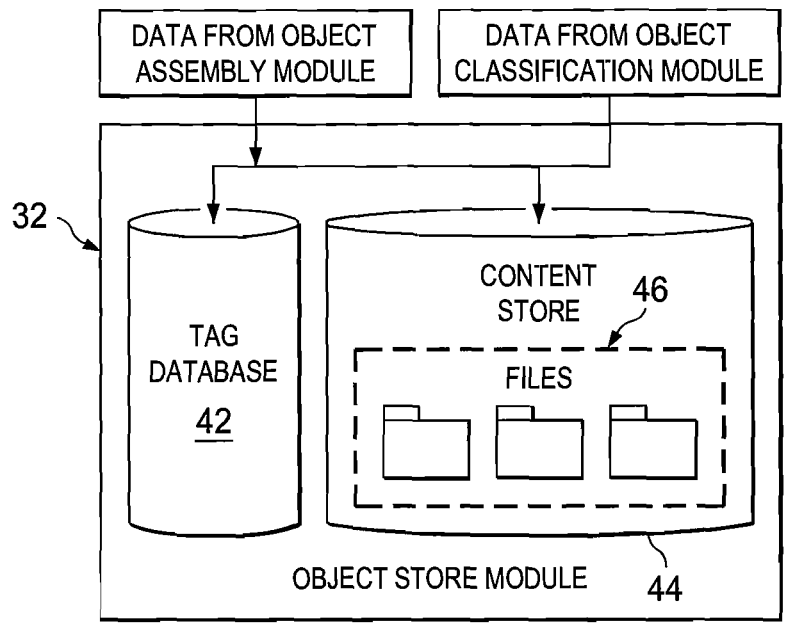
FIG. 5 is a block diagram illustrating an object store module according to one embodiment of the present invention.

With reference to FIG. 5, in one embodiment, the objects are stored in a content store 44 memory block. Within content store 44 are files 46 divided by content type. Thus, for example, if the object classification module determines that an object is a Word document that should be stored, it can store it in the file reserved for Word documents. In one embodiment, object store module 32 is integrally included in capture system 22. In other embodiments, the object store module can be external (entirely or in part) using, for example, some network storage technique such as network-attached storage (NAS) and storage area network (SAN).

In one embodiment, the content store is a canonical storage location, simply a place to deposit the captured objects. The indexing of the objects stored in content store 44 is accomplished using a tag database 42. In one embodiment, tag database 42 is a database data structure in which each record is a "tag" that indexes an object in content store 44 and contains relevant information about the stored object. An example of a tag record in tag database 42 that indexes an object stored in content store 44 is set forth in Table 1:

TABLE 1

| Field Name | Definition (Relevant Information) |
| --- | --- |
| MAC Address | NIC MAC address |
| Source IP | Source IP address of object |
| Destination IP | Destination IP address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |
| Attribute | One or more attributes related to the object |

There are various other possible tag fields, and some embodiments can omit numerous tag fields listed in Table 1.

In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance, and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |
| Attribute | One or more attributes related to the object |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); C++ Source, C Source, FORTRAN Source, Verilog Source (for source or design code authored in these high-level programming languages); C Shell, K Shell, Bash Shell (for shell program scripts); Plaintext (for otherwise unclassified textual objects); Crypto (for objects that have been encrypted or that contain cryptographic elements); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of capture system 22. Capture system 22 knows its own private key, thus, the integrity of the stored object can be verified by comparing a hash of the stored object to the signature decrypted with the public key of capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

In one embodiment, the attributes are completely user-configurable. A user interface provides an attribute editor that allows a user to define attributes by creating an attribute and associating a group of one or more regular expressions with the created attribute. The capture device may come preconfigured with a list of common or popular attributes that may be tailored specifically to the industry into which the capture device is sold.

In one embodiment, a capture device may create new attributes automatically. For example, a capture device may observe that a certain regular expression is being searched with some threshold frequency (generally set to be above normal). The capture device creates an attribute to be associated with this regular expression and begins tagging the newly defined attribute when capturing new objects. In another embodiment, a capture device may suggest that a new attribute be created when a regular expression is searched frequently. In yet another embodiment, a capture device may suggest that an attribute be deleted if infrequently used to make room for another more useful attribute. In terms of the query generation, example embodiments of the present invention allow objects and/or their associated metadata to be searchable upon request. For example, emails, documents, images, etc. may be processed by a capture system and searched.

In several embodiments, capture system 22 has been described above as a stand-alone device. However, the capture system of the present invention can be implemented on any appliance capable of capturing and analyzing data from a network. For example, capture system 22 described above could be implemented on one or more of servers 14 or clients 16 shown in FIG. 1. Capture system 22 can interface with the network in any number of ways, including wirelessly. In one embodiment, capture system 22 is an appliance constructed using commonly available computing equipment and storage systems capable of supporting the software requirements.

Figure 6:
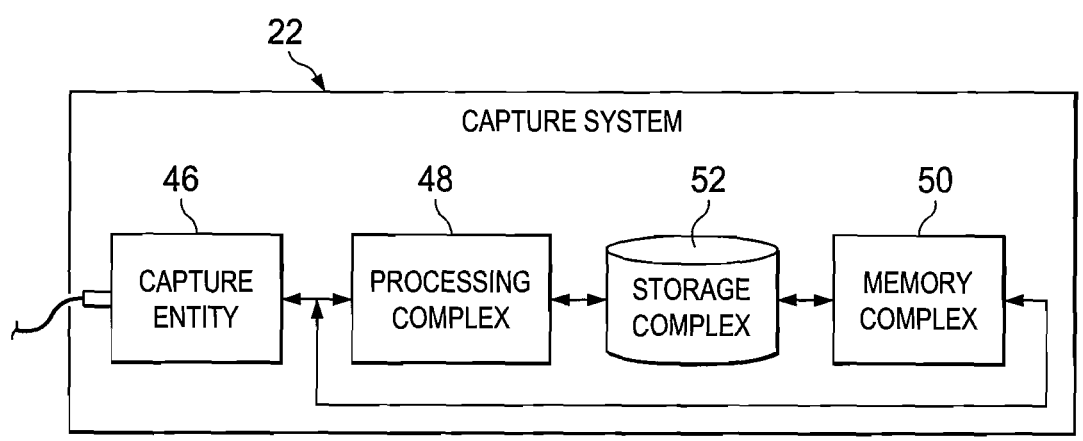
FIG. 6 is a block diagram illustrating an example hardware architecture for a capture system according to one embodiment of the present invention.

In one embodiment, illustrated by FIG. 6, the hardware consists of a capture entity 46, a processing complex 48 made up of one or more processors, a memory complex 50 made up of one or more memory elements such as RAM and ROM, and a storage complex 52, such as a set of one or more hard drives or other digital or analog storage means. In another embodiment, storage complex 52 is external to capture system 22, as explained above. In one embodiment, the memory complex stored software consisting of an operating system for capture system device 22, a capture program, and classification program, a database, a filestore, an analysis engine and a graphical user interface.

FIGS. 7A-12C illustrate several embodiments of a system configuration comprised of a host device and multiple client devices. The graphical user interface discussed allows a host user to centrally manage all client devices. At the same time, it allows for a before, during, and after approach to information protection. The graphical user interface can be part of any suitable network appliance. The appliances are capable of intelligently capturing, classifying and processing all information, regardless of protocol or object type, on a network. They are high speed, non-intrusive, passive security appliances that can collect, classify, analyze, and store network data.

In example embodiments, the GUI presented provides for management capabilities for the following features: monitor (providing real-time scanning and analysis of all network traffic, regardless of content type, protocol or port), capture (storing events related to critical content in an indexed, searchable database, enabling after the fact investigation and improved security), control (defining policies that filter network data, assigning roles to organization stakeholders, providing case management and unified reporting tools to establish workflow processes for remediation of security violations), discover (scanning data repositories to identify and fingerprint sensitive information to ensure protection of data at rest), and prevent (alerting, as well as blocking and filtering techniques in coordination with rules and policies to control information that is traversing or begin stored on the network).

In one embodiment, the host takes over tasks like customizing policies and assigning privileges to users while the client devices focus on core tasks, such as capturing and analyzing network data. It also expands the client devices' reporting capabilities to create an enterprise-wide case management structure. Management may include, for example, finding incidents and violations, investigating anomalies, preparing reports, building cases, and setting up mechanisms to help protect business operations. FIGS. 7A-12C and their corresponding descriptions below further demonstrate these management capabilities. As used herein in this Specification, the term 'incident' encompasses any item that could potentially be detected, discovered, flagged, or otherwise identified by the capture system. Such identification could be part of a rule and/or attribute configuration, or it could be part of a policy defined (or provided as a default) by the architecture. This could involve sensitive information (e.g., social security numbers, important business data), or it could involve more pedestrian communications and documents (e.g., random work product, e-mails, pictures, video data, etc.). All such information (i.e., data segments) propagating over the network is capable of being associated with an incident.

The GUI discussed hereinafter presents the necessary interfaces/views to accomplish the functions described above. (Views and interfaces are used interchangeably to describe a graphical interface that is presented and displayed to the user). In the embodiments shown in multiple FIGURES hereinafter, a tabbed section is illustrated to break up these functionalities into different views, and discussed accordingly in their descriptions. It should be noted that one tab may be associated with multiple views, which are presented initially, "popped-up," linked to, etc. These views may be combined and/or further separated while achieving the same purpose and functionality, and thus not compromising the underlying principles of the invention. It should also be noted that the tabs themselves may be combined and/or separated while still achieving the same purpose and functionality. Moreover, the functionality of the tabs may be implemented in other ways such as by links, buttons, menu options, scrolling pages, etc. It should be appreciated that while these aspects are illustrated a specific way for example purposes in the figures, deviations from these do not compromise the underlying principles of the invention.

Figure 7A:
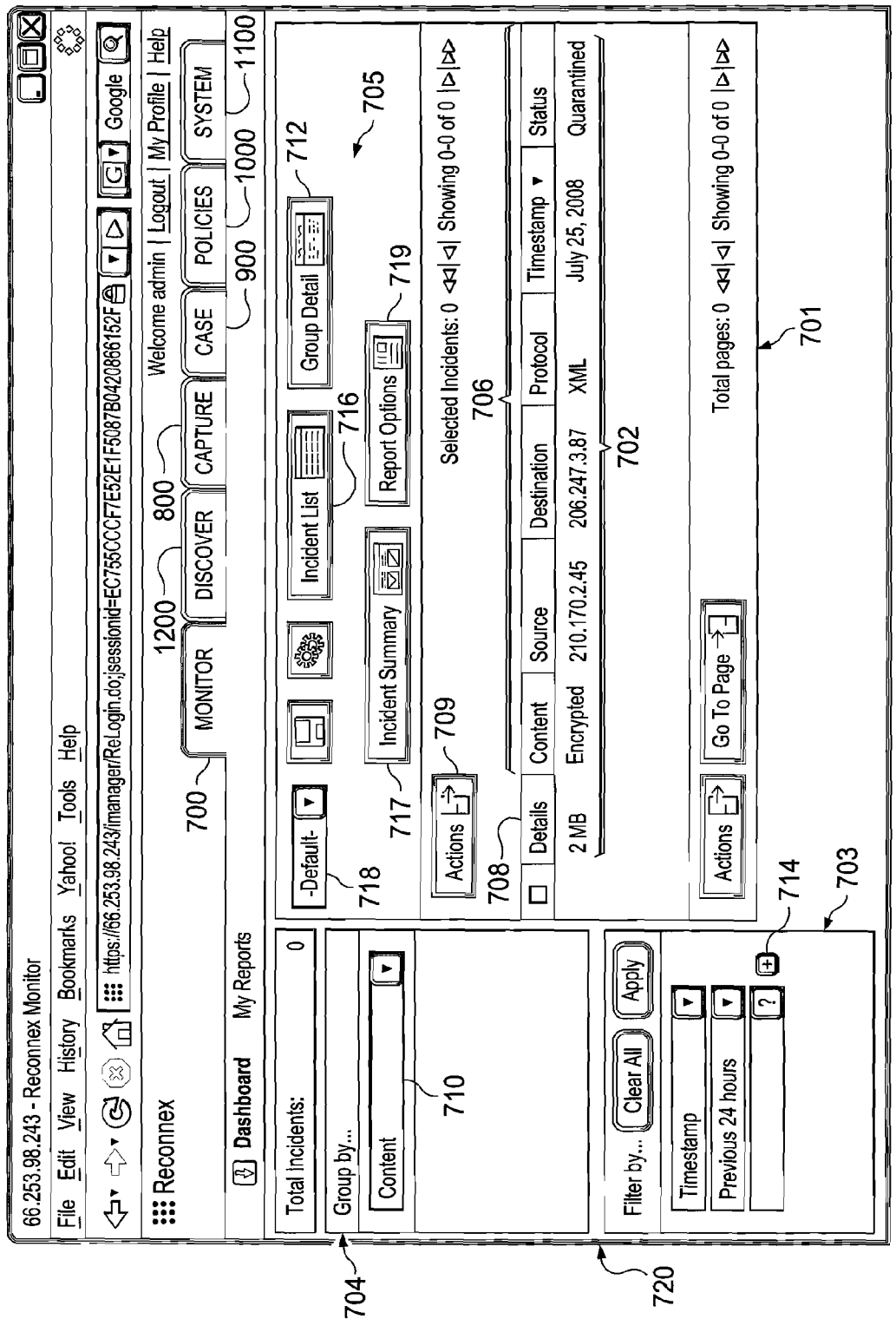
FIG. 7A illustrates one embodiment of presenting a monitoring view.

FIG. 7A illustrates one example embodiment of the presentation of a graphical user interface including various views indicated by tabbed section with six tabs: monitor tab 700, capture tab 800, case tab 900, policies tab 1000, system tab 1100, and discover tab 1200. The embodiment shown in FIG. 7A presents a monitoring view 720 associated with monitor tab 700. This interface is used to provide real-time scanning and analysis of all network traffic. Monitoring view 720 displays incidents and allows the incidents to be grouped, filtered by group and time, and/or viewed in different ways. These grouping selections are termed 'group options' as used herein in this Specification and, further, include anything that could offer a commonality or characteristic associated with a piece of data. Various management actions may be performed from this interface. The example embodiment shown in FIG. 7A includes a viewing section 701 that displays incidents 702, a filtering section 703, a grouping section 704, and various triggers 705 for performing various related actions.

For example, the user may wish to filter incidents to a specified group or time, and then only those resulting incidents can be displayed in the viewing section. Various attributes 706 are illustrated in columns for each incident in the viewing section. Attributes 706 may include, for example, any of the tags associated with the captured object (e.g., content, source, destination, protocol, timestamp, etc.), a status of an incident, a priority of an incident, or any other identifying information associated with the incident. The user may customize which attributes he wishes to display. This customization is applicable to attributes displayed in other views discussed hereinafter.

In this non-limiting example of FIG. 7A, an example incident has been identified. The incident includes a section for details (relating to the size of the file [2 MB] and identifying the message as encrypted], source [which in this example includes an IP address of 210.170.2.45], destination [which includes the IP address 206.247.3.87], protocol [XML], timestamp [Jul. 25, 2008], and status [quarantined].

The embodiment shown in FIG. 7A includes the display of a details trigger, which presents a view with more detailed information about a specific incident. It should be understood that many types of trigger may be implemented (e.g., button, tab, hyperlink, icon, filename, pull down menu, etc.) without compromising the underlying principles of the invention. Moreover, it should be understood that the trigger locations may vary and/or be located in multiple locations without compromising the underlying principles of the invention. Likewise, it should be understood that a view that displays a trigger to initiate a specific interface could be implemented with the interface itself displayed in the view (instead of the trigger), without compromising the underlying principles of the invention.

Additional triggers not shown in FIG. 7A but which may be displayed are: 1) a "match" trigger, which presents a view for informing the user what text was flagged by the capture engine; 2) an "incident" trigger, which presents a view for informing the user why the incident was reported; 3) a "concepts" trigger, which presents a view for informing a user if a concept was used to flag an incident; 4) a "case" trigger, which presents a view informing the user whether or not a case was filed on the incident, and if so, gives all of the relevant information about the case; 6) a "history" trigger, which presents a view for informing the user of historical information regarding the incident, such as who looked at the incident and what actions they took when viewing it; and 7) an "object" trigger, which opens the object in its appropriate application.

In the example embodiment shown in FIG. 7A, actions menu 709 presents a menu of triggers for performing different actions. Example triggers include, but are not limited to, modifying a status, modifying a reviewer, modifying a resolution, modifying a severity, modifying comments, selecting all results, deleting selections, assigning an incident to a case. New cases can be created for investigating selected incidents. Cases are discussed in further detail in the discussion for case tab 900.

In the embodiment shown in FIG. 7A, "group details" trigger 712 is displayed and triggers further grouping possibilities with the resulting incidents displayed in the viewing section 701 from the groupings already selected. Grouping section 704 displayed in FIG. 7A provides an interface for the user to group incidents. Groupings may include, for example, content, destination IP, destination location, destination port, filename, host IP, host name, policy, protocol, reviewer, rule, sender, severity, source IP, source location, source port, status, user ID, user city, user company, user country, user department, user groups, user email, user manager, user name, user title, and user zipcode.

Figure 7B:
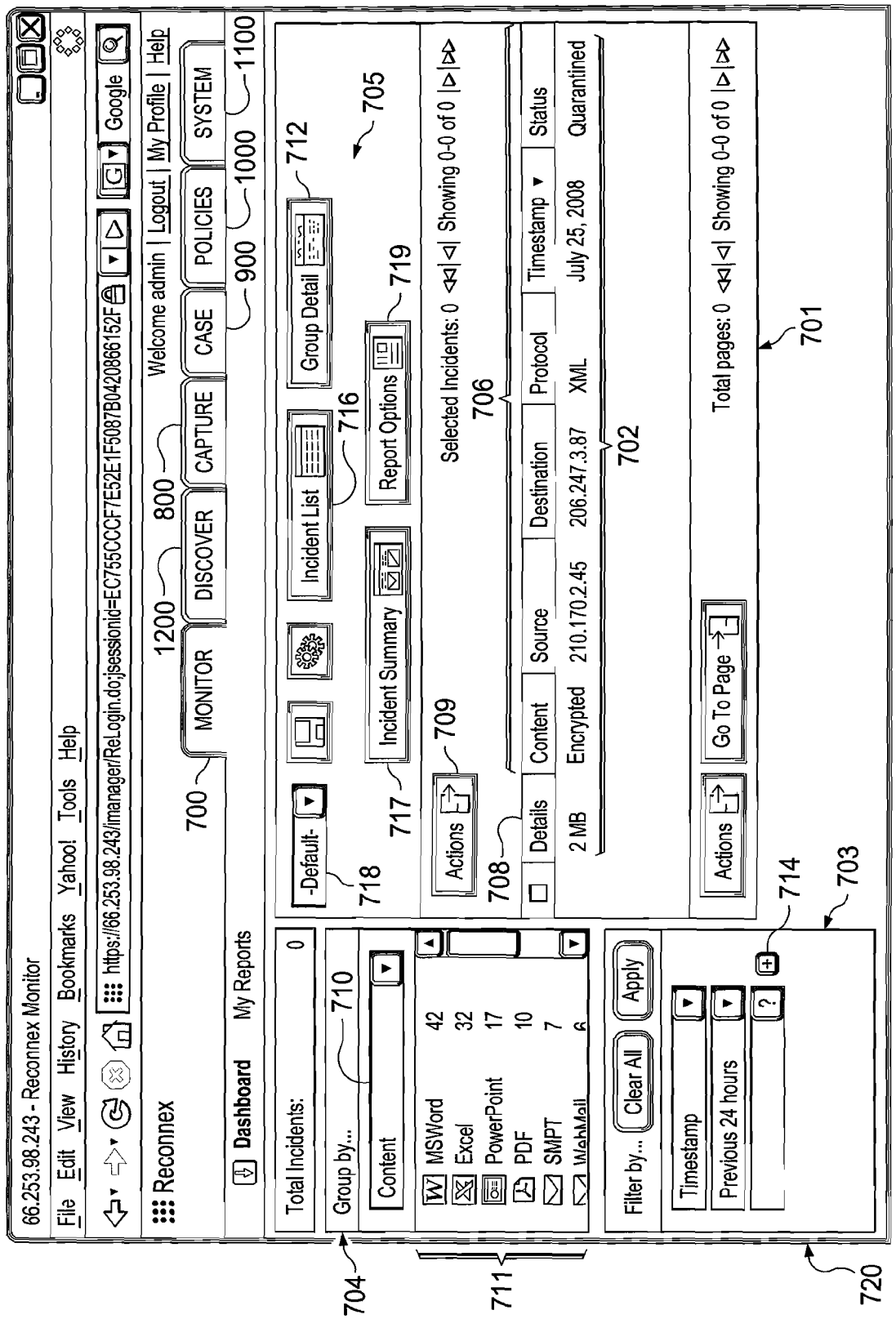
FIG. 7B illustrates one embodiment of presenting a content breakdown of the file types that have been captured for incidents that have been grouped.

When a specific grouping is selected, the incidents are presented according to that specific grouping. For example, as illustrated in FIG. 7B, when entry field 710 is selected to be content, a content breakdown 711 is displayed and presents a breakdown of the file types that have been captured in the current results. A file type can then be selected and the corresponding resulting incidents displayed in viewing section 701.

Filtering section 703 displayed in FIG. 7A allows entry of parameters for filtering incidents by group and/or time. Entry fields, as discussed herein, may be an entry field for the user to type in, a pull down menu for the user to select from, a pop up menu with boxes to check off, or any other type of field that allows a user to define parameters. Groupings and filtering groups for incidents may include, but are not limited to: action, comments, content, destination IP, destination location, destination port, filename, host IP, host name, incident ID, match count, number of cases, number of children, policy (e.g., indicating specific policies that have been violated, which could be used with sender to investigate policy violations of a specific user), protocol (e.g., posts to message boards may be monitored using a protocol filter=http_Post; along with content equals <bad word>), recipients, reviewer, rule, sender, severity (e.g., critical violation, minor violation, etc.), signature, size, source IP, source location, source port, subject, status, user ID, user city, user company, user country, user department, user groups, user email, user manager, user name, user title, and user zipcode.

Time periods may include, but are not limited to: anytime, previous 24 hours, previous 30 minutes, this week, previous week, this month, previous month, whole year, and custom dates. Upon filtering, the resulting incidents will be displayed in viewing section 701. Multiple filters may be performed simultaneous or sequentially, with the subsequent filter being performed on the resulting incidents from a previous filtering. Furthermore, filtering by group or time may occur alone or in conjunction with groupings in grouping section 704. In one embodiment, viewing section 701 displays highlights that provide a snapshot of the actual violation that was flagged for the incident. For example, a highlight may indicate that a social security number was the reason for the violation or flagging.

Figure 7C:
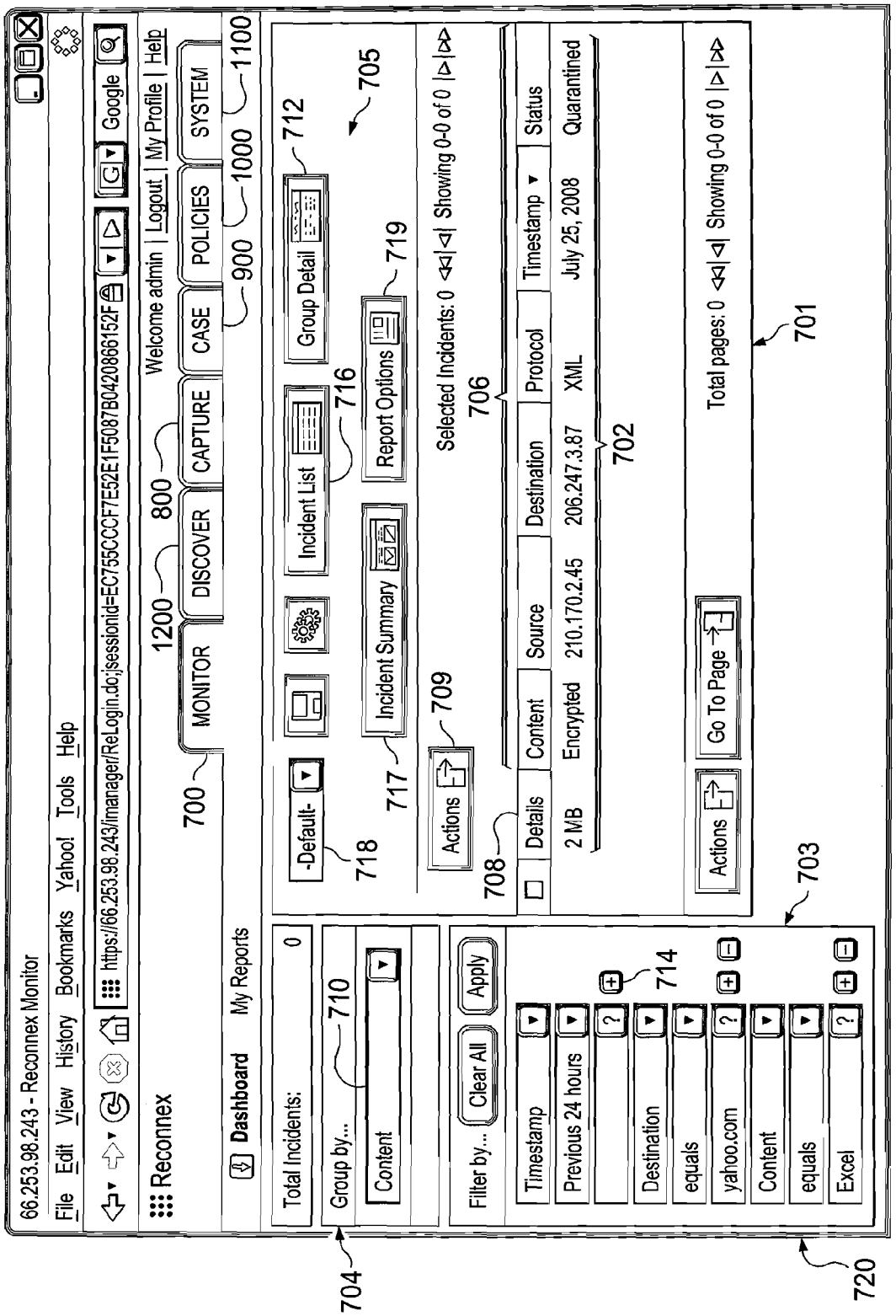
FIG. 7C illustrates one embodiment of a filtering section with multiple filtering entry fields.

Trigger 714 triggers the display of additional filtering entry fields to further filter the resulting incidents by group or time. FIG. 7C illustrates one embodiment of filtering section 703 with multiple filtering entry fields present. As illustrated, only incidents meeting the filtering parameters will be displayed in viewing section 701 (i.e., only incidents that occurred within the last 24 hours; have a destination IP of yahoo.com; and that are associated with captured objects of the Excel file type). Operator fields may be included to assist in entering parameters for filtering, as illustrated in FIG. 7C by an operator field.

Returning to viewing section 701, information relating to the incidents may be displayed in different views. The incident information may be presented in a view that displays the incidents and their attributes (as shown in viewing section 701 in FIG. 7A); or in a view that provides quick statistical overviews based on grouping and filtering choices; or a in a view that presents incidents in quick summary formats such as charts and tables (e.g., charts representing incidents by severity versus status, incidents by policy over time; tables representing incident-view, policy-sender, rule-sender, policy-rule, image-rule, etc.). In the embodiment shown in FIG. 7A, these views are initiated by the three triggers 716, 712, 717, respectively.

Trigger 718 presents different types of views. Examples default views may include, for example, incident-view, policy-sender, rule-sender, policy-rule, image-rule, etc. In addition, custom views may be created and saved as reports. These custom reports may be saved and used to regularly monitor events that a user considers significant. Another trigger (not shown) may be displayed to schedule or send selected reports to other users. Trigger 719 shown in FIG. 7A displays all reports scheduled for the user or that the user has saved. A default setting 718 is also provided.

Figure 8A:
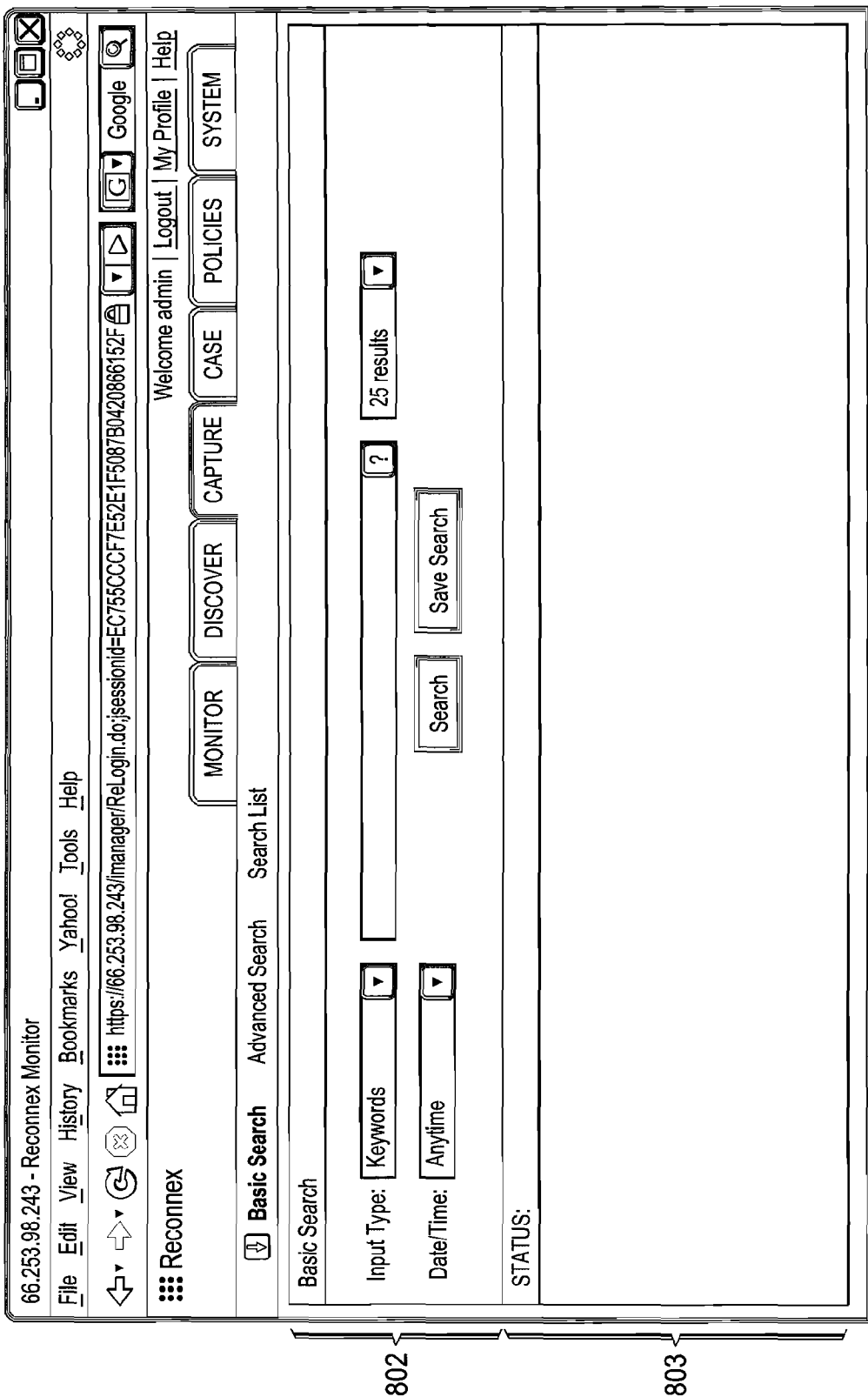
FIG. 8A illustrates one embodiment of a basic search view.

FIG. 8A illustrates one embodiment of a basic search view 813 associated with capture tab 800. Basic search view 813 enables the user to search incidents, the tag database based on search parameters corresponding to the tag fields, and/or the content store. Furthermore, the search parameters can also include other indexed search criteria, such as single dictionary keywords, and non-indexed search criteria, such as word patterns (i.e., concepts).

Basic search view 813 includes entry fields 802 to enter parameters of a search. In the example embodiment shown in FIG. 8A, searching view 813 includes an entry field for an input type (e.g., keywords, protocol, location, IP address, email from address, email to address, user subject, user ID, custom, etc.), an entry field for a user input applicable to the input type in entry field 802, and an entry field for date/time entry, and an entry field for how many results to display. It should be understood that operators/Boolean expression may be applicable for entry into some entry fields as well. The resulting incidents from the search are displayed in a viewing section 803. Searches may also be saved and/or scheduled. In one embodiment, viewing section 803 displays highlights that provide a snapshot of the actual violation that was flagged for the incident. For example, a highlight may indicate that a social security number was the reason for the violation or flagging.

Figure 8B:
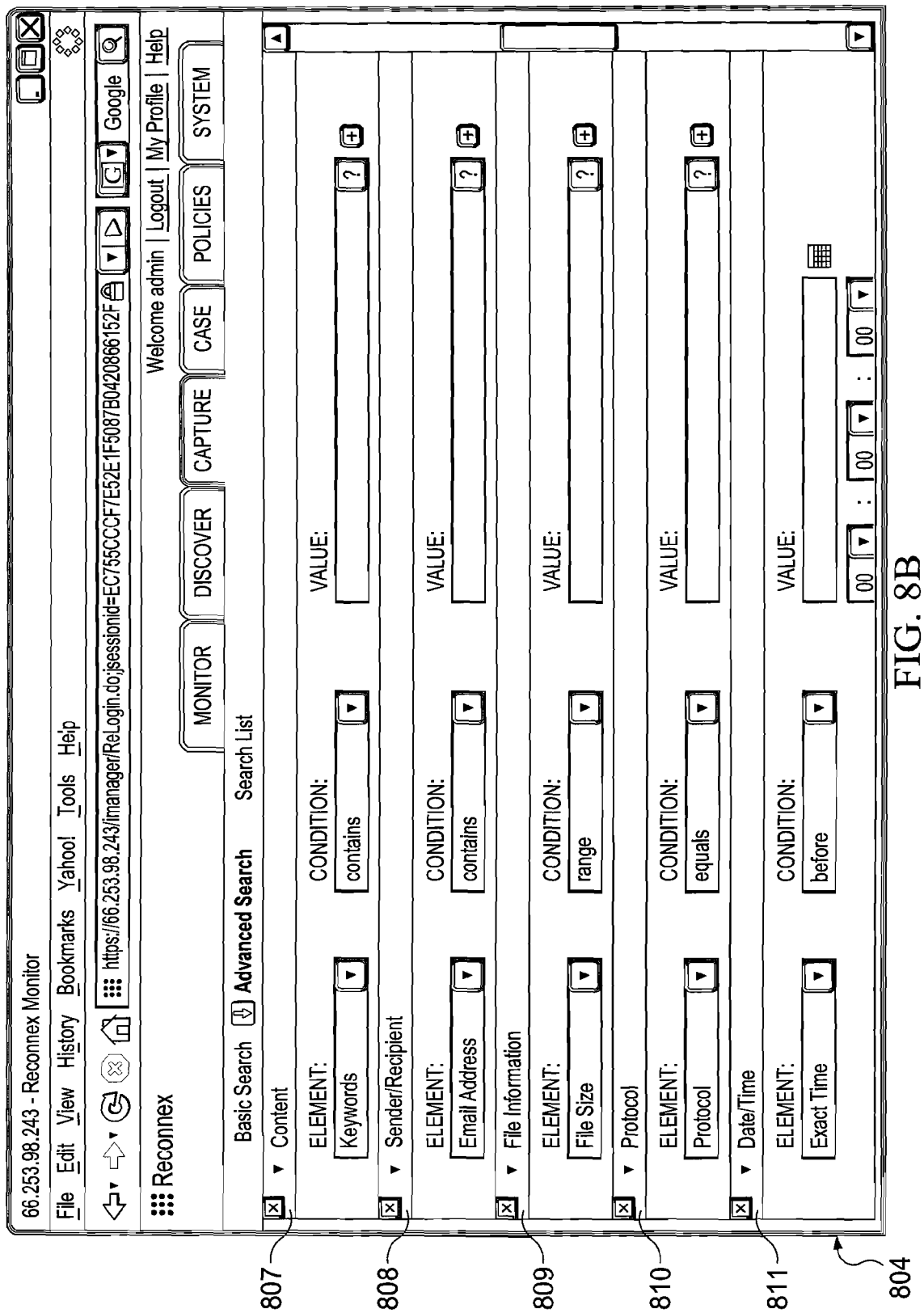
FIG. 8B illustrates one embodiment of the presentation of an advanced searching view.

FIG. 8B illustrates one embodiment of the presentation of an advanced searching view 804 associated with capture tab 800. Searching view 804 provides a display for the user to enter more detailed search parameters (e.g., multiple searches, various categories, and/or parameter expressions based on user-entered values and elements). For example, the embodiment shown in FIG. 8B displays entry fields for parameters in categories 807-811 (content, sender/recipient, file information, protocol, and date/time, respectively). In the embodiment shown in FIG. 8B, each category implements an entry field for a desired element, a condition, and user input value for that element and condition. The elemental choices depend on the category. For example, content category 807 may include, but is not limited to, elements such as keyword, concept, concept type, and template. Sender/recipient category 808 may include, but is not limited to, elements such as email address, IP location, email subject, location, URL, user ID, and template. File information category 809 may include, but is not limited to, elements such as file size, MD5, and template. Protocol category 810 may include, but is not limited to, elements such as protocol, port, and template. Date time category 811 may include, but is not limited to, elements such as exact time. A user could select one of the elements and a corresponding condition (e.g., contains, does not contain, exact phrase, expression, range, greater than, less than, before, etc.) and then enter a specific value to be applied to the element and condition. Templates contain a collection of elements to assist in searching. Default templates as well as user-created templates may be displayed for selection when the template element is selected.

Figure 8C:
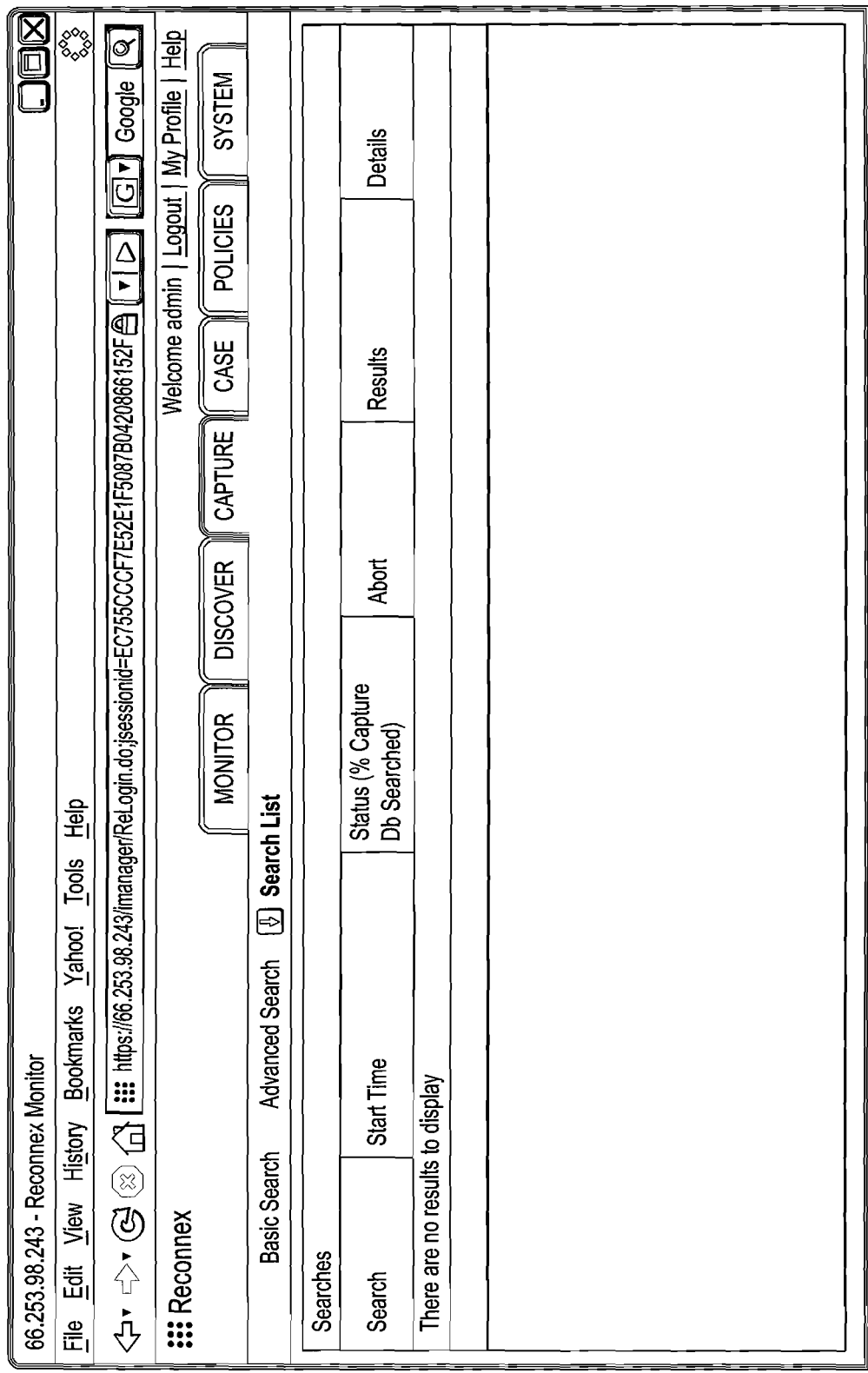
FIG. 8C illustrates one embodiment of the presentation of a search list view.

FIG. 8C illustrates one embodiment of the presentation of a search list view 812 associated with capture tab 800. Search list view 812 displays searches that are and/or that have been performed along with various attributes of the searches. The attributes may include, but are not limited to start time, progress of the search (status), whether the search has been aborted, the results of a search, and a details trigger similar to the one described above. Again, a "details" trigger presents a display of more detailed information about a specific incident, and which may include any of the additional triggers discussed above. In the example embodiment shown in FIG. 8C, viewing section 813 lists searches along with their corresponding attributes in a column format.

Figure 9A:
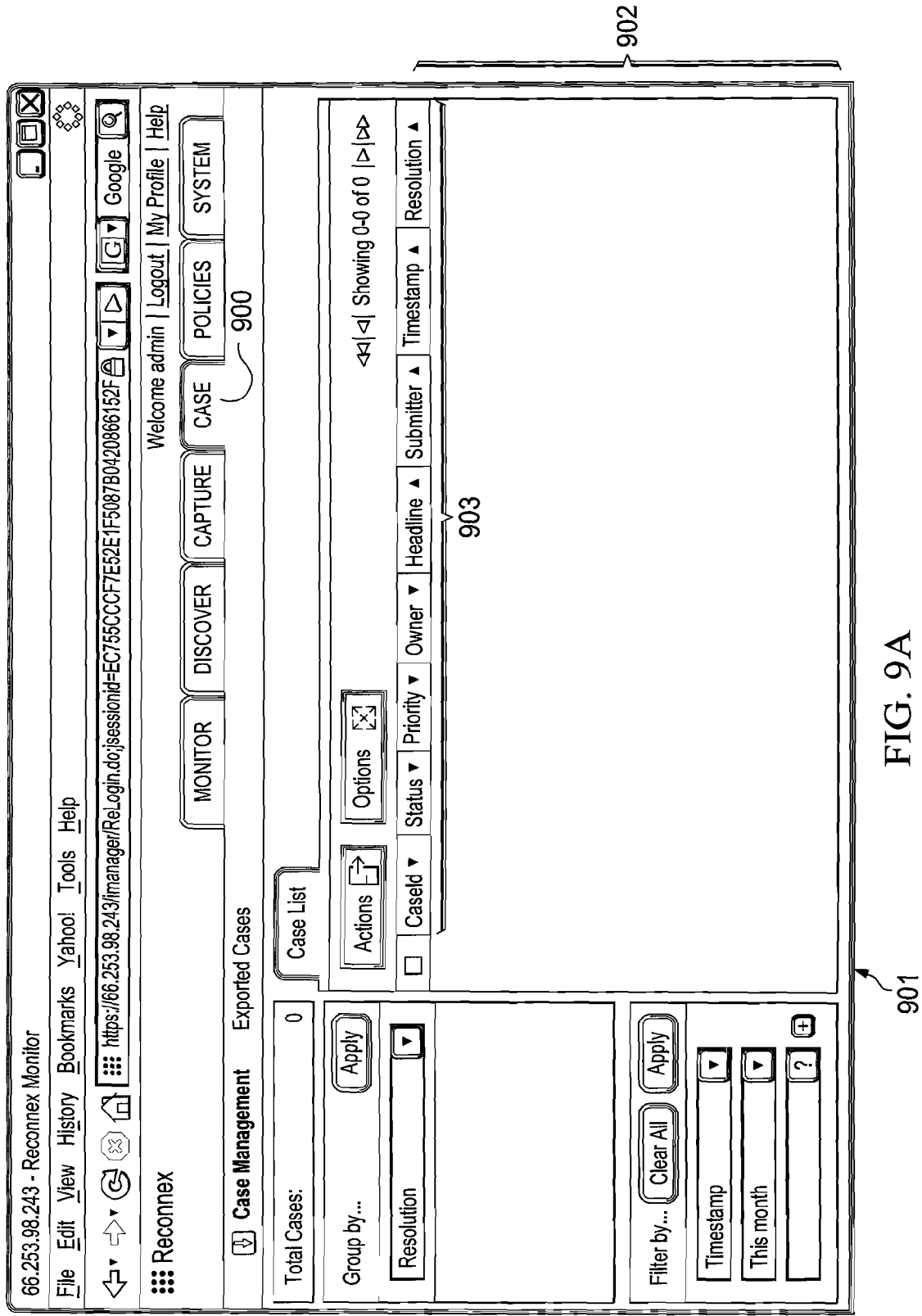
FIG. 9A illustrates one embodiment of a case management view.

FIG. 9A illustrates one embodiment of a case management view 901 associated with case tab 900. Case management view 901 displays cases that have been created to investigate incidents. Case management view 901 enables a user to create a new case, to export selected cases, and/or to download cases. Through case management view 901, a user can create a framework of individual responsibility that encourages other users to cooperate in the resolution of a case. For example, a chief security officer (CSO) [suspecting crucial information has been leaked by a particular user] can notify the user's supervisor, the head of the department, the director of the business unit, etc. Those managers can add their comments to the case, attach files, change status, ownership, and priority of the case, export or download it, escalate or reassign it, all the while sending notification of these actions to others, such as Human Resources or Legal.

In the example embodiment shown in FIG. 9A, case management view 901 displays existing cases in viewing section 902 in list format with attributes 903 for the cases in column headings. Example attributes may include, but are not limited to Case ID, Status, Priority, Owner, Headline, Submitter, Timestamp, and Resolution, Notify Submitter, Date last modified, Keywords, Export, and Details (i.e., details trigger). Actions menu 905 displays triggers to perform various actions (e.g., create a new case, export selected cases, download cases, etc.).

Figure 9B:
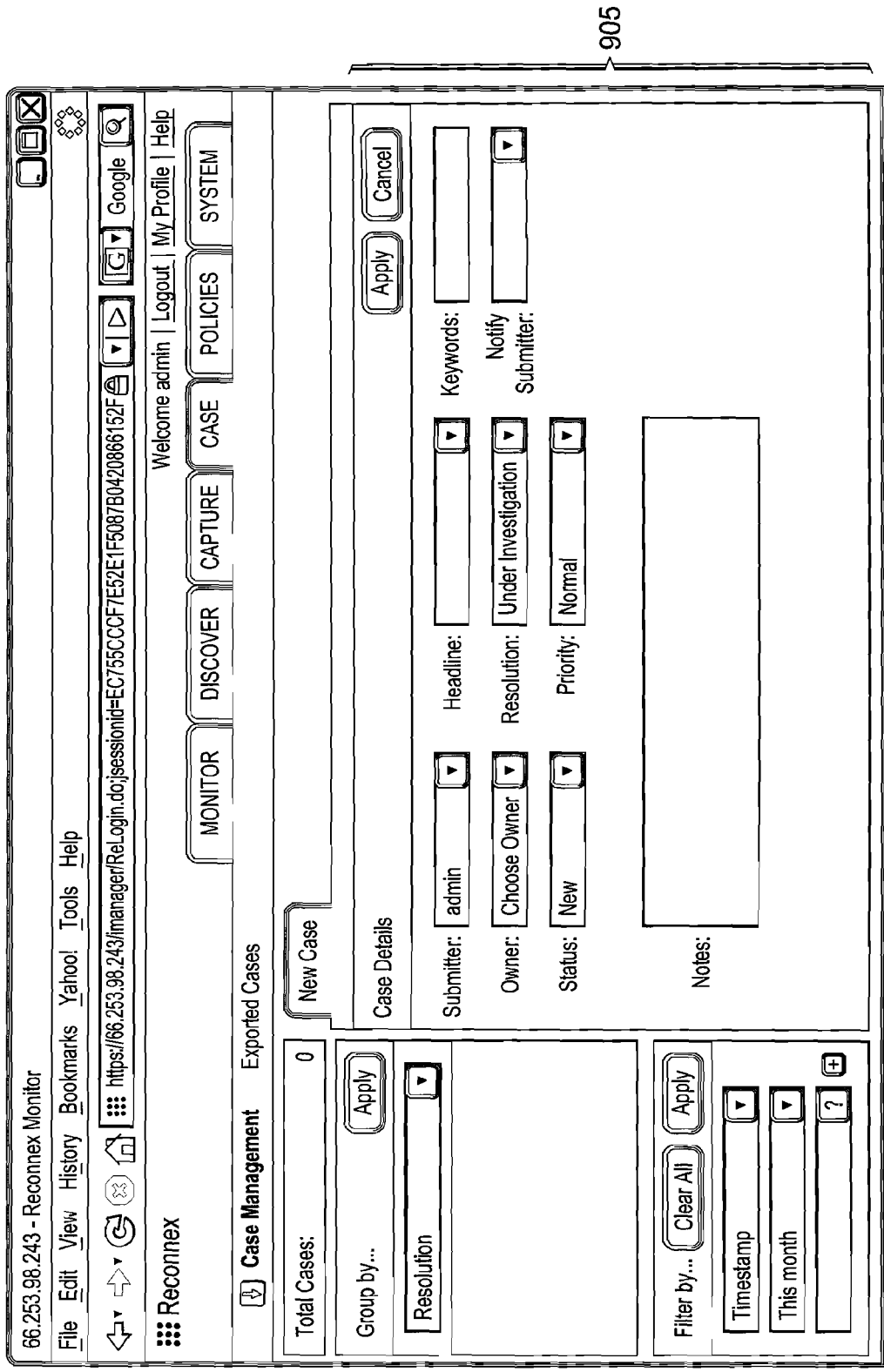
FIG. 9B illustrates one embodiment of a new case view displayed after initiating a trigger to create a new case.

FIG. 9B illustrates one embodiment of a new case view 904 displayed after initiating a trigger to create a new case. New case view 904 displays entry fields 905 to allow case details to be entered by the user. Examples of such information include, but are not limited to, naming and describing the problem, defining a headline, assigning an owner, selecting a resolution state, defining the status, indicating an urgency/priority of the case, adding keywords, adding notes, and notifying the submitter if desired. Creation of cases can be triggered directly from viewing section 701.

Figure 9C:
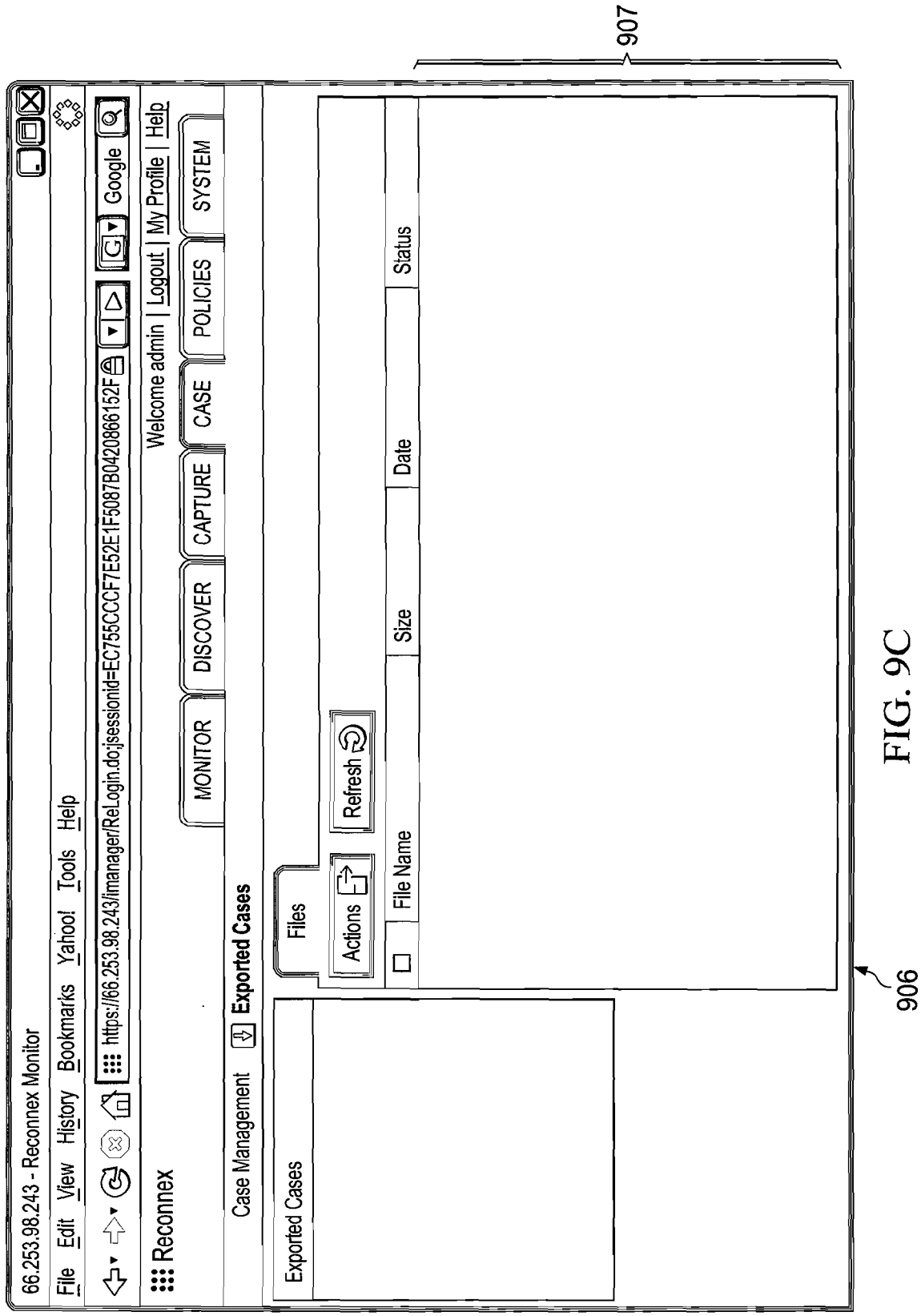
FIG. 9C illustrates one embodiment of an exported cases view.

FIG. 9C illustrates one embodiment of an exported cases view 906 displaying files and their attributes in a viewing section 907. The exported cases view 906 displays cases that have been exported.

Rules specify data to be found on the network. They scan network data (including indexed database, content store, and/or transmitting data) that matches the conditions defined in that rule. There are also rules, referred hereinafter as action rules, which define some action that will be take if a rule produces a "hit." Action rules can be applied to different rules, and examples include, but are not limited to, sending email notifications using dynamic variables to multiple recipients, creating log entries in a syslog server, delegating responsibility for the result to a reviewer, assigning a status to the incident, preventing data loss. Concepts are pattern-matching tools that use text patterns or regular expressions to identify collection of related objects. For example, credit cards use a wide range of different numbering patterns, which may be collected into a single concept and applied against captured data. Templates are used, for example, to save keystrokes when searching or creating rules or capture filters. They contain a collection of elements that would otherwise have to be typed in repetitively. Standard, pre-created templates may exist and new templates may be created by users. Policies are sets of rules that search the data stream for specific incidents and/or violations. Default policies may exist and new policies may be created by users. Using rules and policies, a user can, for example, tune the system to perform certain actions when an incident is found, find specific concepts that have been programmed, or create and use templates to expedite search processes.

FIG. 10A illustrates one embodiment of the presentation of a policies view 1001 associated with the policies tab 1000. Policies view 1001 displays existing policies along with triggers for displaying views related to managing the policies (e.g., adding policies, activating/deactivating policies, modifying the owner, deleting policies, modifying devices, etc.). In the example embodiment shown in FIG. 10A, policies view 1001 displays policies and attributes in a viewing section 1002. Viewing section 1002 displays any default policies and/or user-created policies. Attributes 1004 for the policies are displayed as well. Examples of attributes include, but are not limited to, the policy name, a description, the policies state, its owner, its last modified date, and on which device the policy is deployed.

Figure 10B:
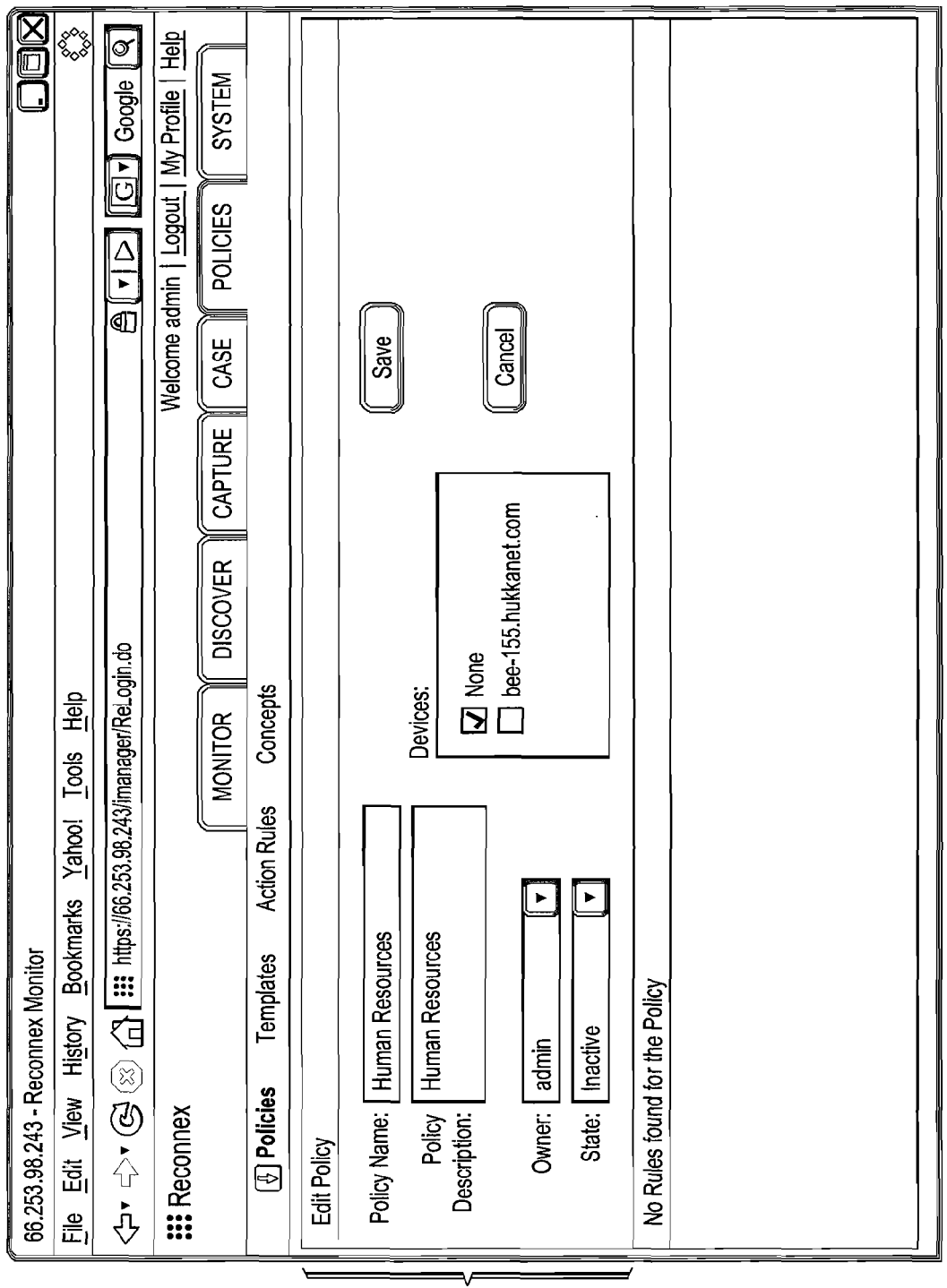
FIG. 10B illustrates one embodiment of a display that is presented after initiating a trigger for adding a new policy.

FIG. 10B illustrates one embodiment of a display that is presented after initiating a trigger for adding a new policy. Entry fields 1030 are displayed for entering details of the policy. Example details include, but are not limited to, the policy name, description, owner, state, and devices deployed on. Any rules applied to the policy may be displayed along with their attributes. Examples of these attributes include, but are not limited to, rule name, severity, state, and any action defined.

Figure 10C:
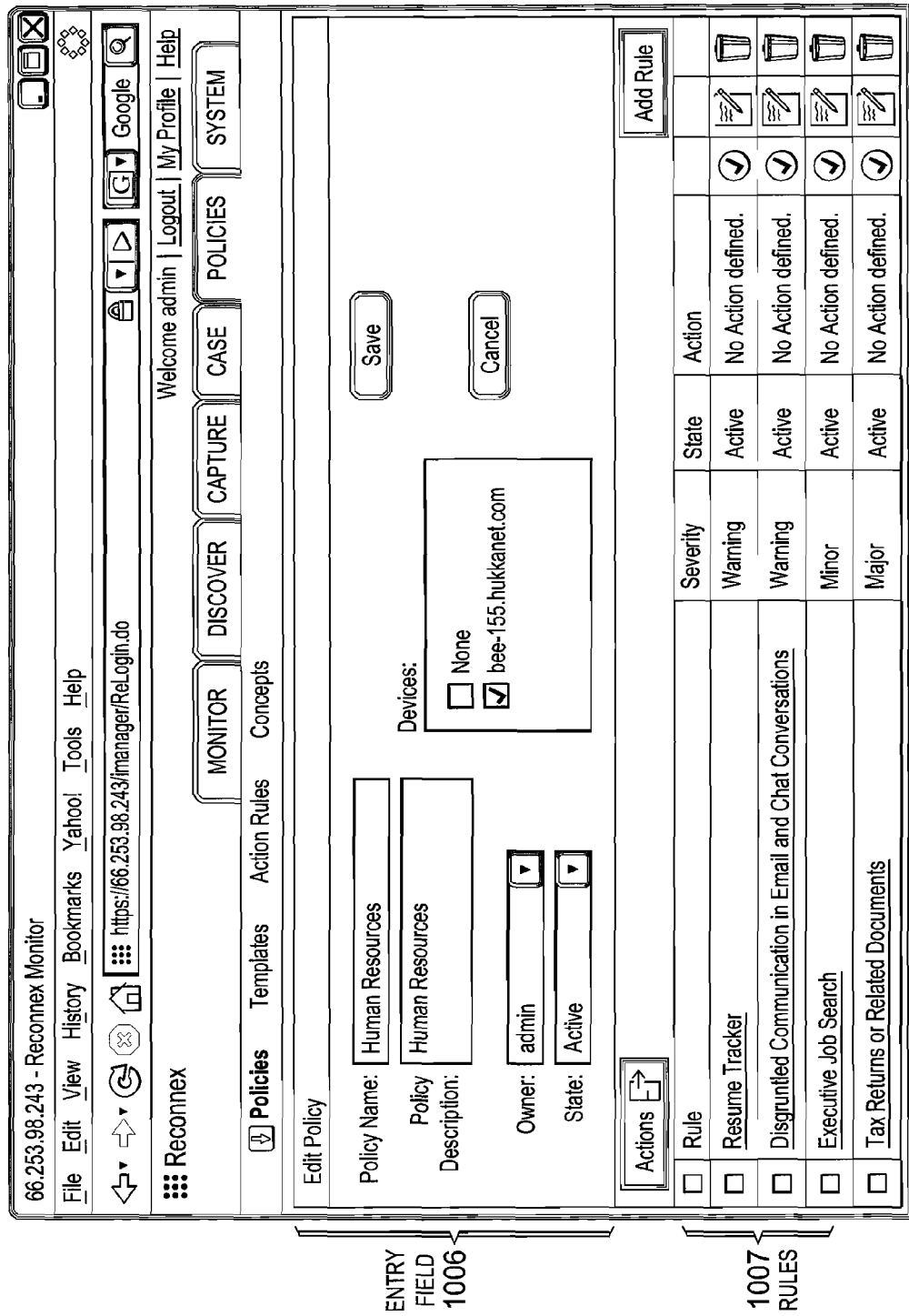
FIG. 10C illustrates one embodiment of a display that is presented after initiating a trigger for editing a policy.

FIG. 10C illustrates one embodiment of a display that is presented after initiating a trigger for editing a policy (e.g., the "Human Resources" policy 1003 displayed in viewing section 1002 of FIG. 10A). The trigger may be initiated from a variety of ways including, for example, selecting a box 1007 and then choosing the corresponding trigger in an actions menu, or by simply clicking on the policy listed in viewing section 1002, or by clicking on the policy and choosing the appropriate trigger from a displayed menu, etc. In the embodiment shown in FIG. 10C, the corresponding details of the policy are presented in entry fields 1006, which may be edited by the user. Example details include, but are not limited to, the policy name, description, owner, state, and devices deployed on. Any rules applied to the policy may be displayed along with attributes. Examples of these attributes include, but are not limited to, rule name, severity, state, and any action defined. These rules may be viewed and edited by initiating the appropriate trigger, which may include simply clicking on the rule.

Figure 10D:
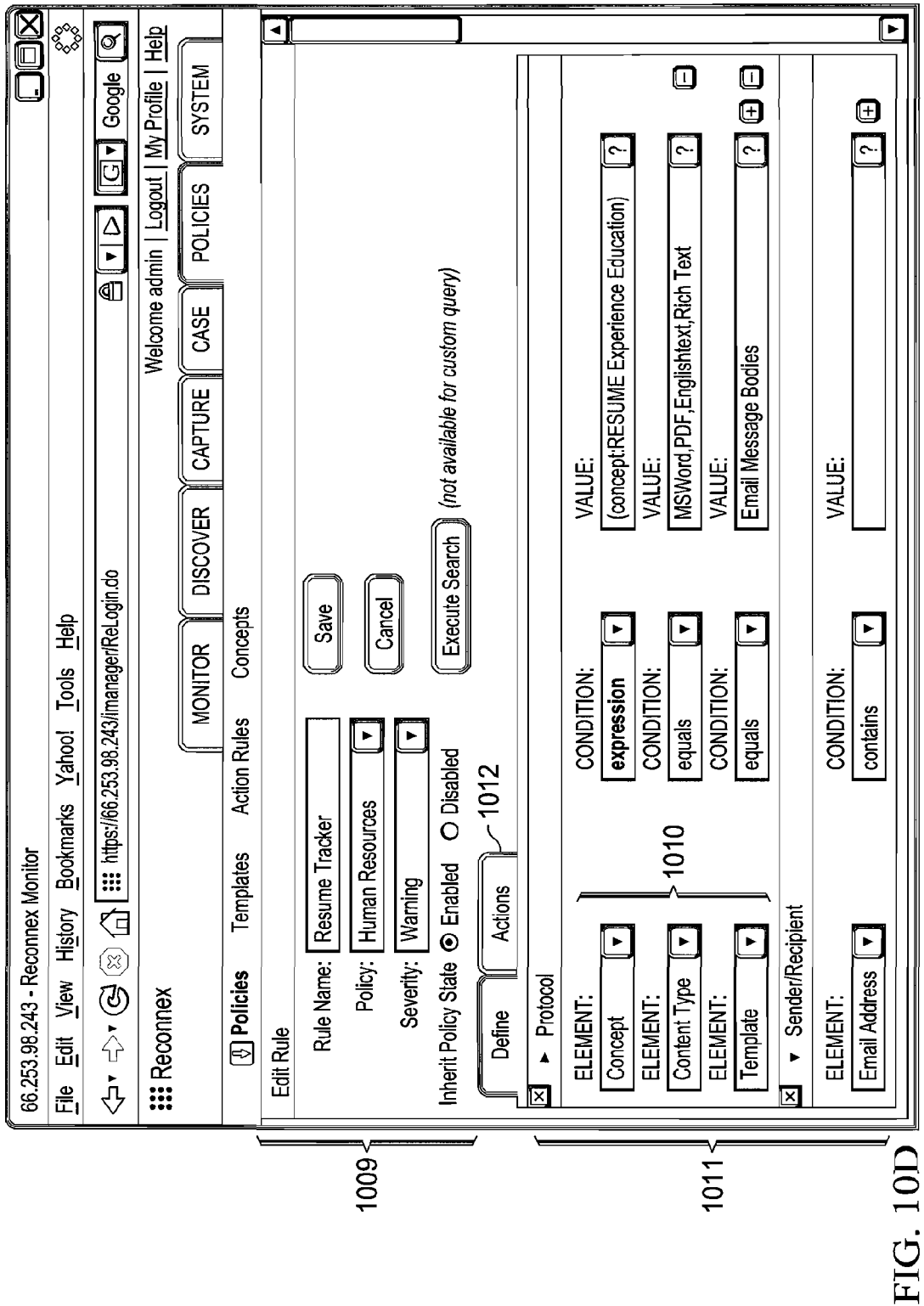
FIG. 10D illustrates one embodiment of a display that is presented after initiating a trigger for viewing and editing a rule.

FIG. 10D illustrates one embodiment of a display that is presented after initiating a trigger for viewing and editing a rule. Entry fields 1009 display the details of the rule and allow a user to edit the details. Also shown displayed in the embodiment of FIG. 10D are entry fields 1010 for entry of parameters to define the rule. In the embodiment shown, entry fields 1010 are broken up into different categories 1011. The same discussion of categories, elements, conditions, and values applies here with the entry fields 1010 of FIG. 10D. Upon initiation, the trigger displays any action rules that have been defined.

Figure 10E:
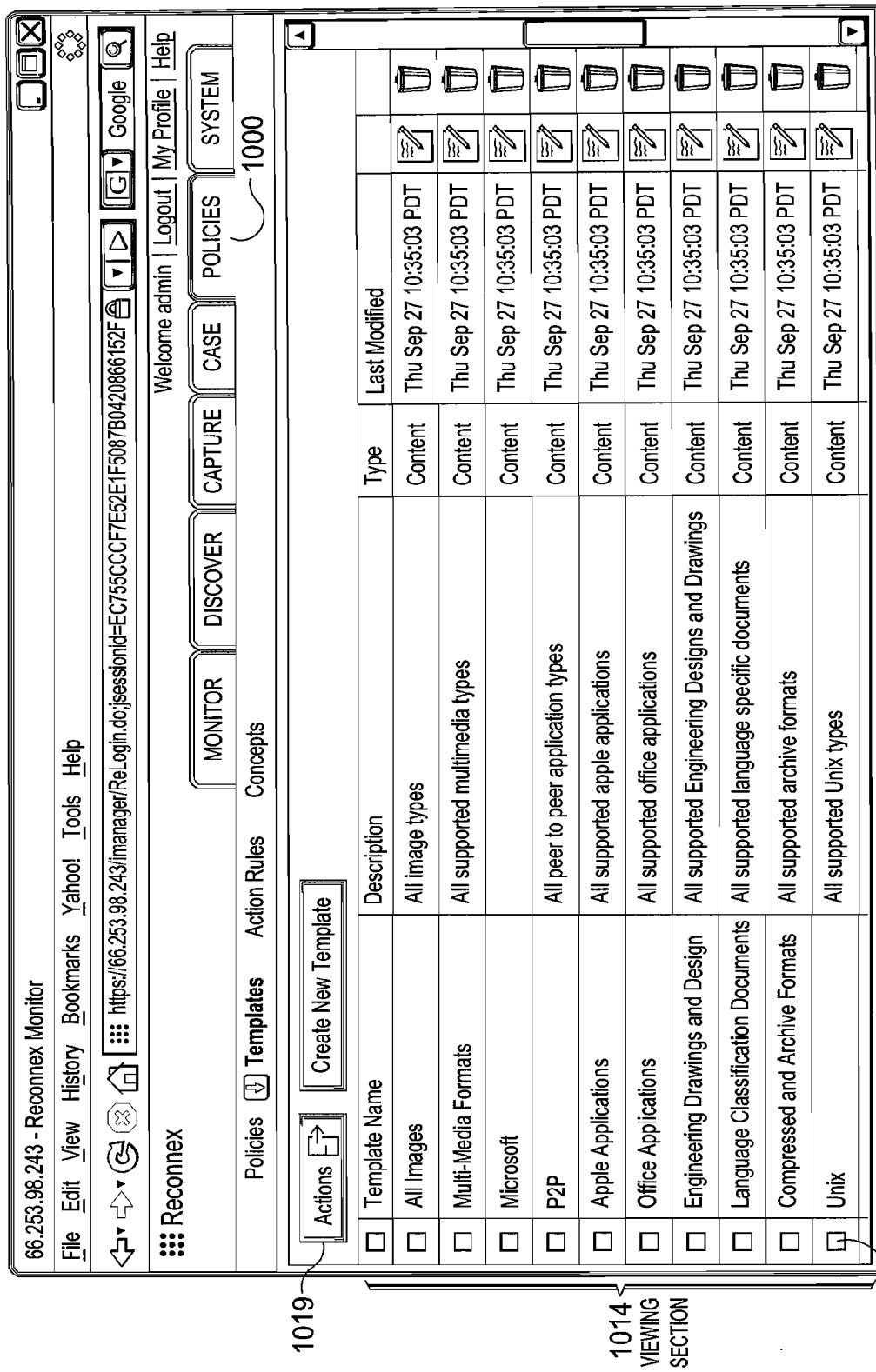
FIG. 10E illustrates one embodiment of the templates view.

FIG. 10E illustrates one embodiment of a templates view 1013 associated with policies tab 1000. Templates view 1013 displays existing templates along with triggers for performing actions related to the templates. Templates view 1013 displays a viewing section 1014. Displays may be triggered that include, but are not limited to, creating new templates, editing templates, activating templates, deleting templates. An actions menu 1019 is also provided, along with a set of boxes 1018 for user selection.

Figure 10F:
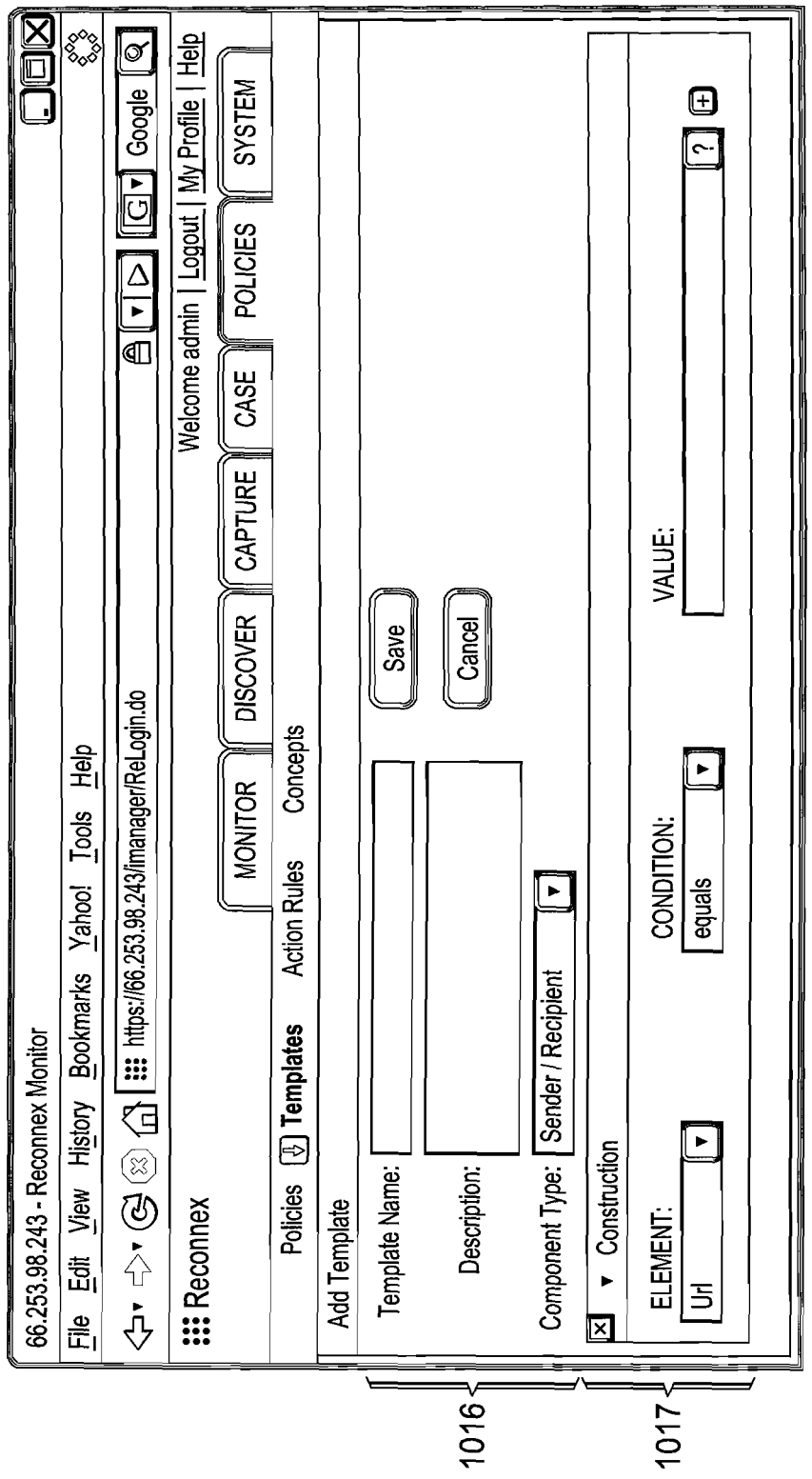
FIG. 10F illustrates one embodiment of a display that is presented after initiating a trigger for creating a new template.

FIG. 10F illustrates one embodiment of a display that is presented after initiating a trigger for creating a new template. Entry fields 1016 are displayed for entering details of the template. Example details include, but are not limited to, the template name, description, and component type (e.g., sender/recipient, protocol information, content, network filter, file information, etc.). Entry fields 1017 are displayed within a construction category. Elements vary depending on component type. For example, elements for the sender/recipient component type include, but are not limited to, URL, email subject, IP address, location, email address, and user ID. Alternatively, elements for the content component type may include, but is not limited to, content type, concept, keywords, etc.

Figure 10G:
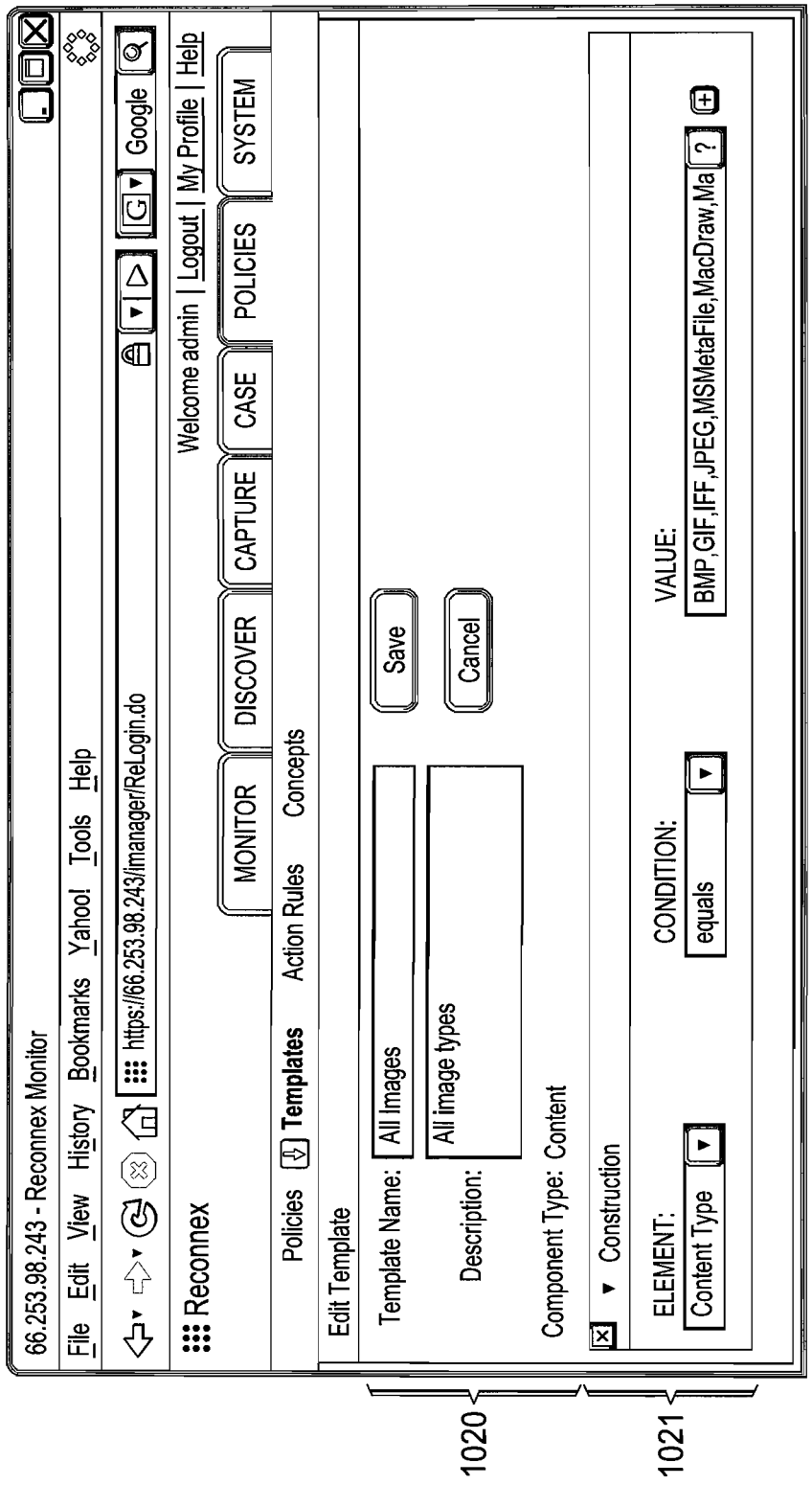
FIG. 10G illustrates one embodiment of a display that is presented after initiating a trigger for editing a template.

FIG. 10G illustrates one embodiment of a display that is presented after initiating a trigger for editing a template (e.g., the "All images" template displayed in viewing section 1014). The trigger may be initiated from a variety of ways including, for example, selecting box 1018 and then choosing the corresponding trigger in actions menu 1019, or by simply clicking on the template listed in viewing section 1014, or by clicking on the template and choosing the appropriate trigger from a displayed menu, etc. In the embodiment shown in FIG. 10G, the corresponding details of the template are presented in entry fields 1020, which may be edited by the user. The current elements, condition, and values for the template are displayed in entry fields 1021.

Figure 10H:
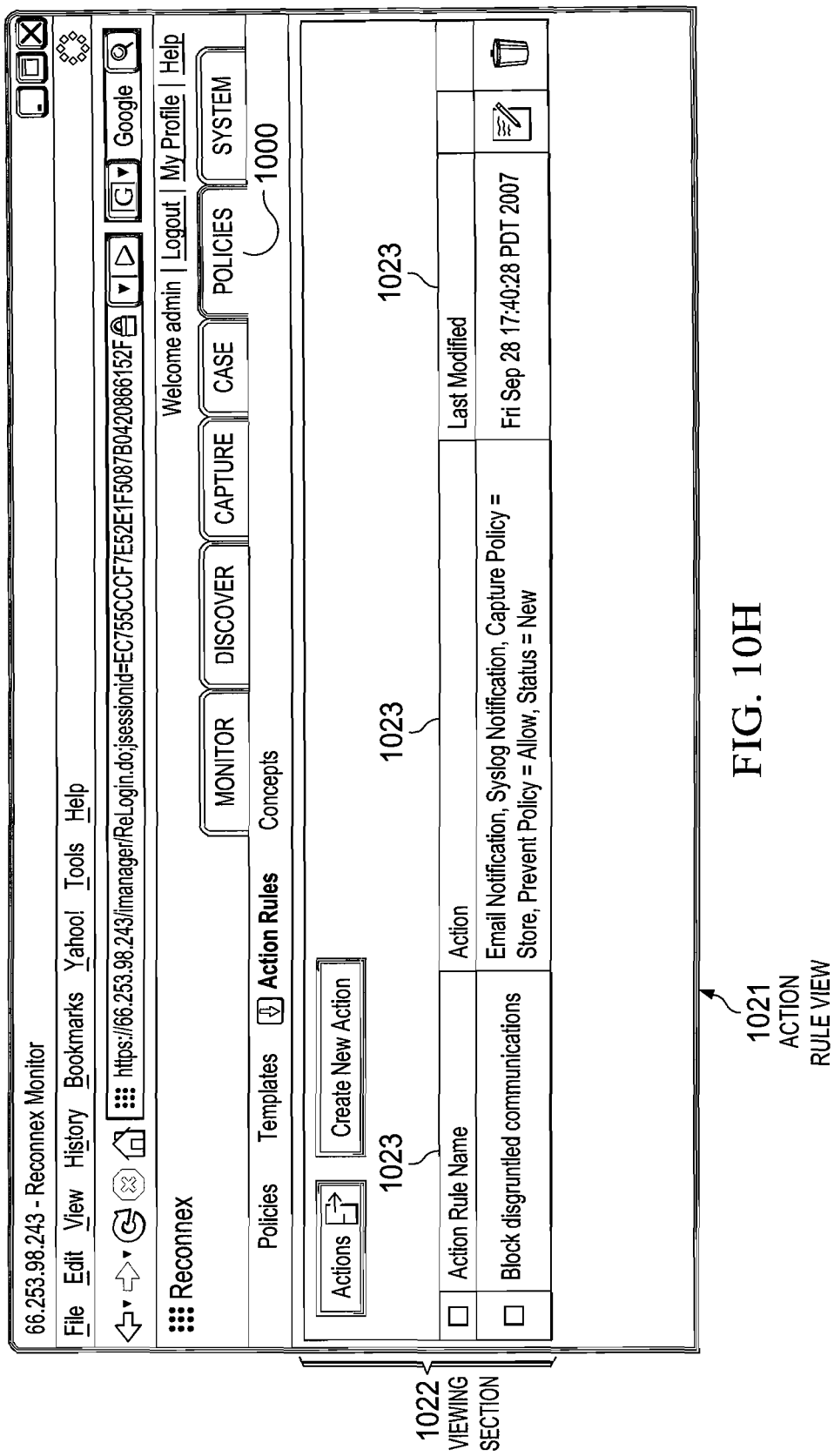
FIG. 10H illustrates one embodiment of an actions rule view.

FIG. 10H illustrates one embodiment of an actions rule view 1021 associated with policies tab 1000. Actions rule view 1021 displays existing action rules along with triggers for performing actions related to the action rules. Action rules view 1021 displays a viewing section 1022 and triggers 1023. Example triggers include, but are not limited to, adding new action rules, editing action rules, activating action rules, deleting action rules etc. Viewing section 1022 displays any default action rules and/or user-created action rules. Attributes 1023 for the action rules are displayed as well. In the embodiment shown, the attributes make up column headings for action rules that are listed in viewing section 1022. Various combinations of attributes may be displayed and the user may customize which attributes are displayed. Examples of attributes include, but are not limited to, the action rules name, a description of the action, and its last modified date.

Figure 10I:
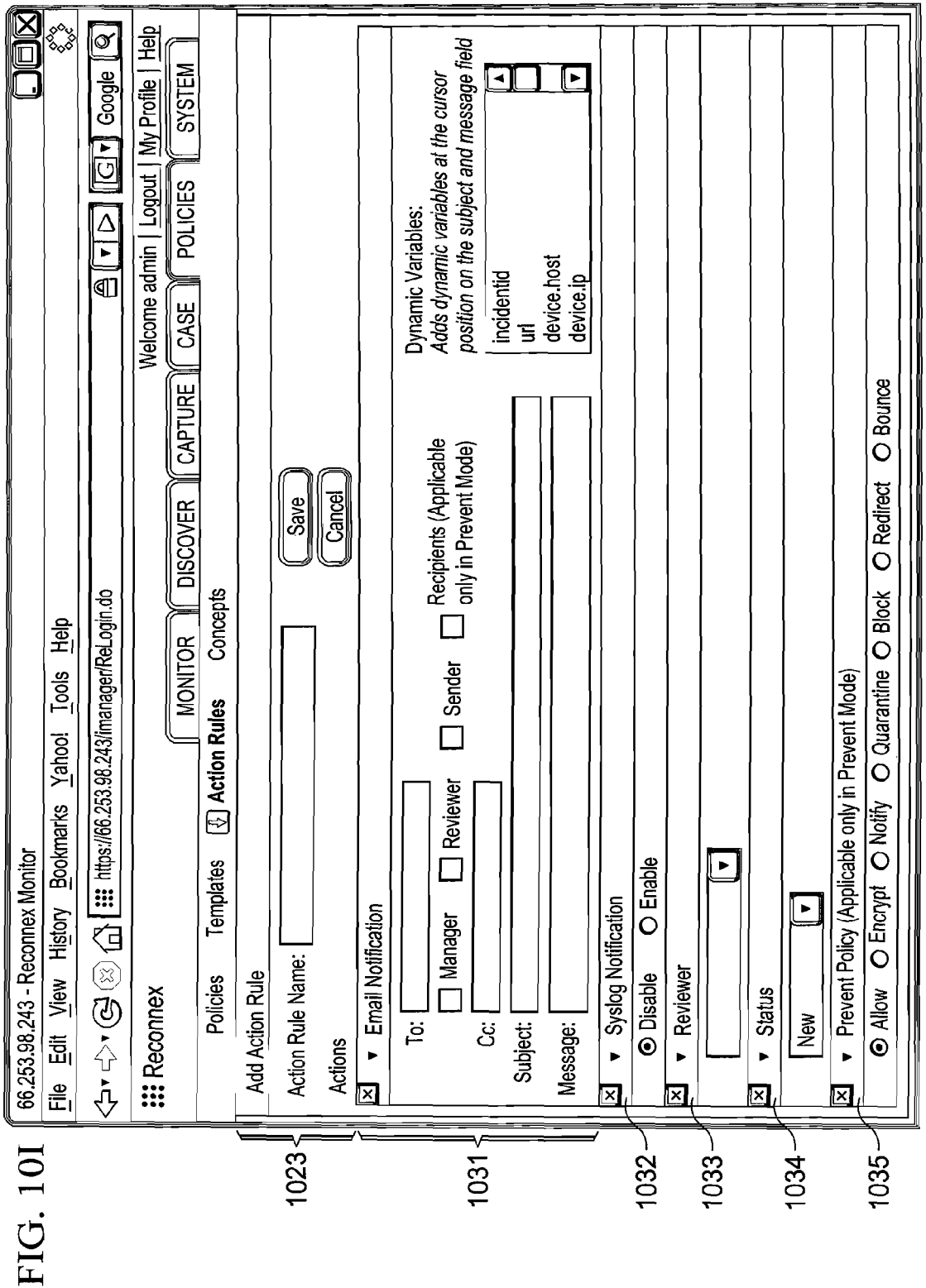
FIG. 10I illustrates one embodiment of a display that is presented after initiating a trigger for creating a new action rule.

FIG. 10I illustrates one embodiment of a display that is presented after initiating a trigger for creating a new action rule. Entry fields 1023 are displayed for entering details of the action rule. Example details include, but are not limited to, the action rule name and description. In the embodiment shown in FIG. 10I, entry fields are broken up into expandable categories 1031-1035. Example include, but are not limited to, email notification 1031 (e.g., for defining email content, addresses, etc.), syslog notification 1032 (e.g., enable, disable), reviewer 1033, status 1034, and prevent policy 1035 (e.g., allow, encrypt, notify, quarantine, block, redirect, bounce, etc.).

Figure 10J:
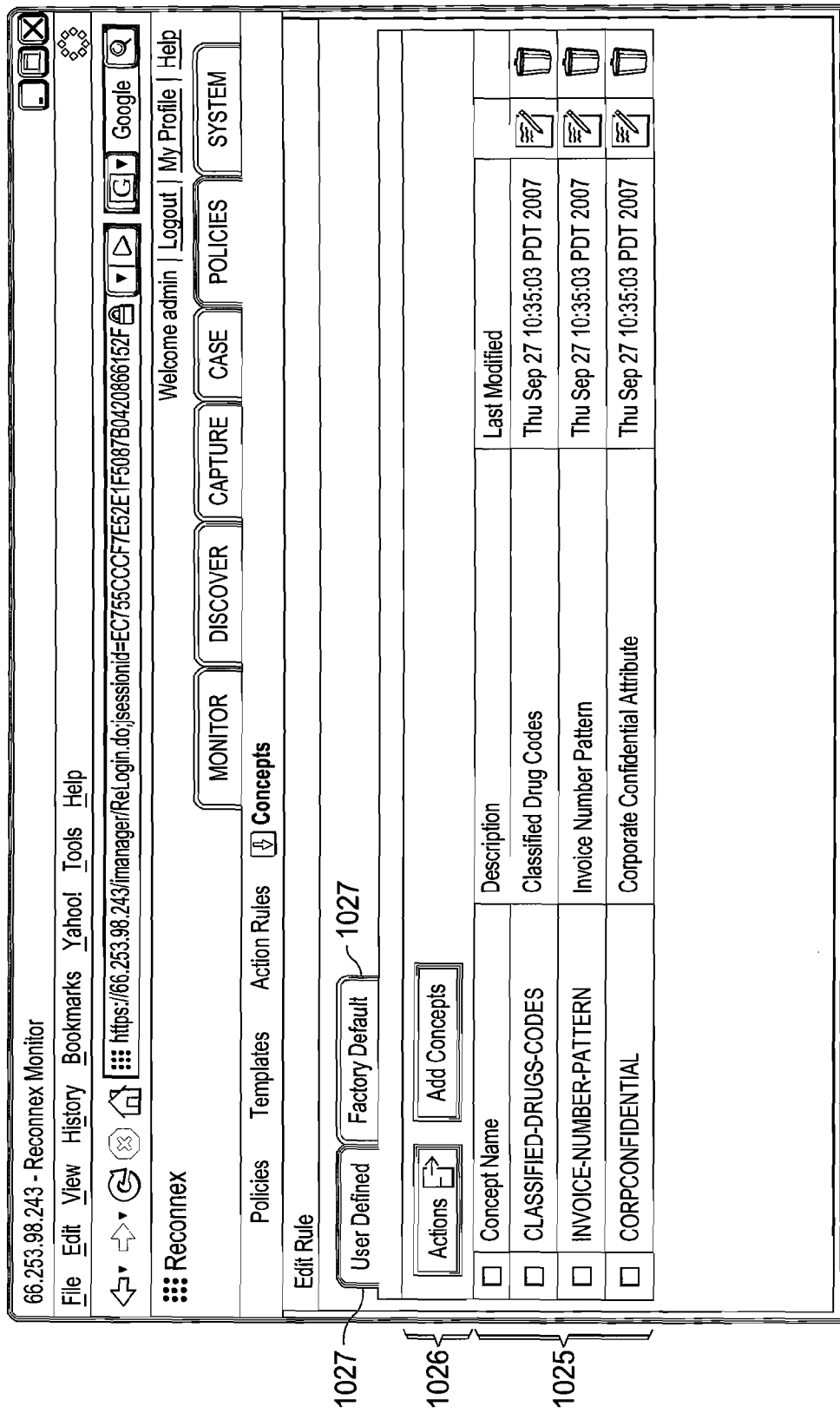
FIG. 10J illustrates one embodiment of a concepts view.

FIG. 10J illustrates one embodiment of a concepts view 1024 associated with policies tab 1000. Concepts view 1024 displays existing concepts along with triggers for performing actions related to the concepts. Concepts view 1024 displays a viewing section 1025 and triggers 1026, where tabs 1027 offer a choice between user configurable parameters and factory default settings. Example triggers include, but are not limited to, triggers to present displays for adding new concepts, editing concepts, and deleting concepts etc. Viewing section 1025 displays any default concepts and/or user-created concepts. Attributes 1023 for the concepts are displayed as well. Examples of attributes include, but are not limited to, the concepts name, a description of the concept, and its last modified date.

Figure 10K:
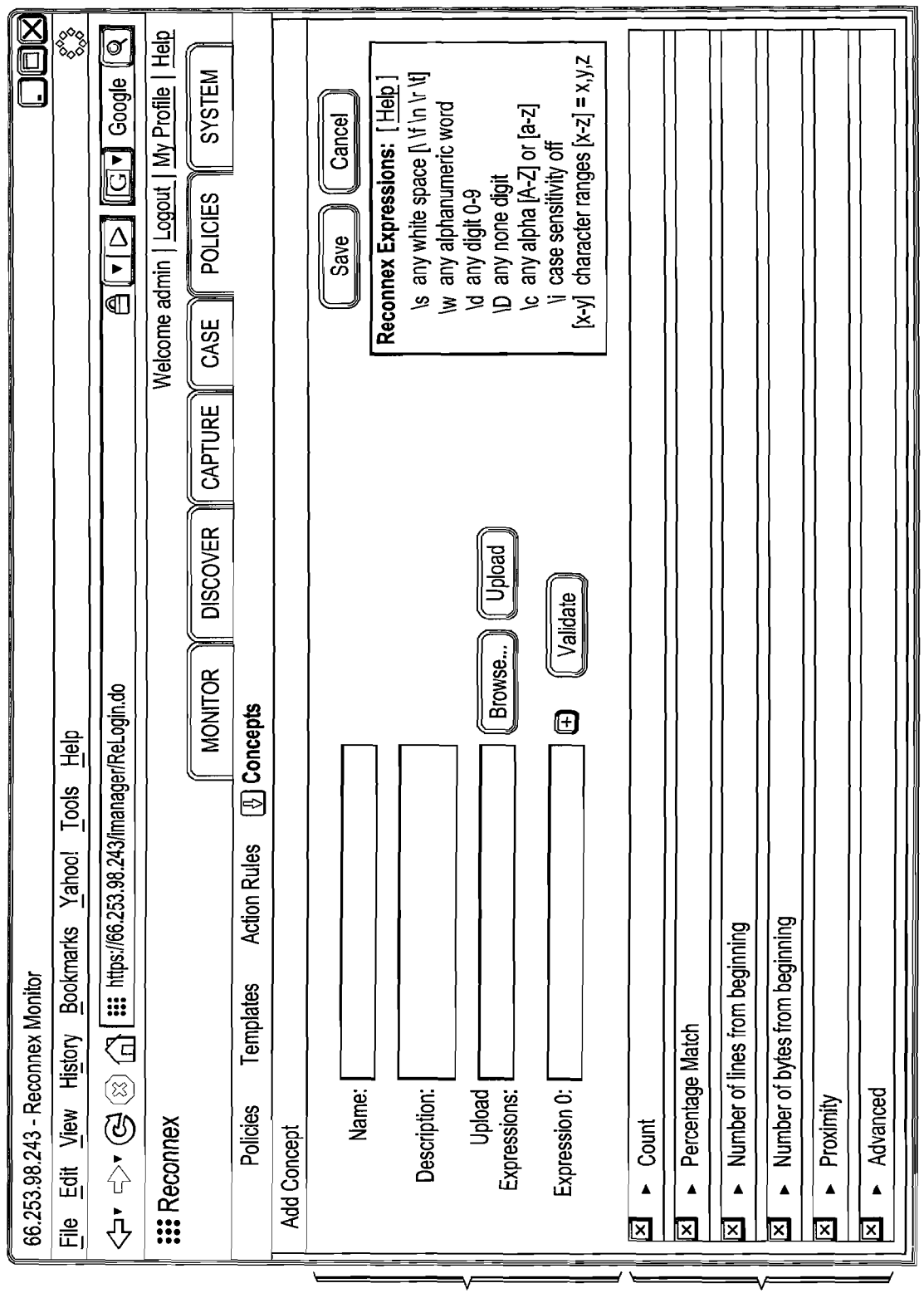
FIG. 10K illustrates one embodiment of a display that is presented after initiating a trigger for creating a new concept.

FIG. 10K illustrates one embodiment of a display that is presented after initiating a trigger for creating a new concept. Entry fields 1028 are displayed for entering details of the concepts. Example details include, but are not limited to, the concept's name, description, and any expressions to be applied. In the embodiment shown in FIG. 10K, entry fields 1029 are broken up into expandable categories. Example include, but are not limited to, count, percentage match, number of lines from beginning, number of bytes from beginning, proximity, and advanced.

Count, percentage match, number of lines from beginning, and number of bytes from beginning may include, but are not limited to, entry fields for a condition (e.g., equal to, less than, greater than), a value, and an expression. Proximity may include, but is not limited to, entry fields for a concept, a condition (e.g., equal to, less than, greater than), a byte, and an expression. Advanced may include, but is not limited to, entry fields for distinguishing between content type concepts and network type concepts.

Figure 11A:
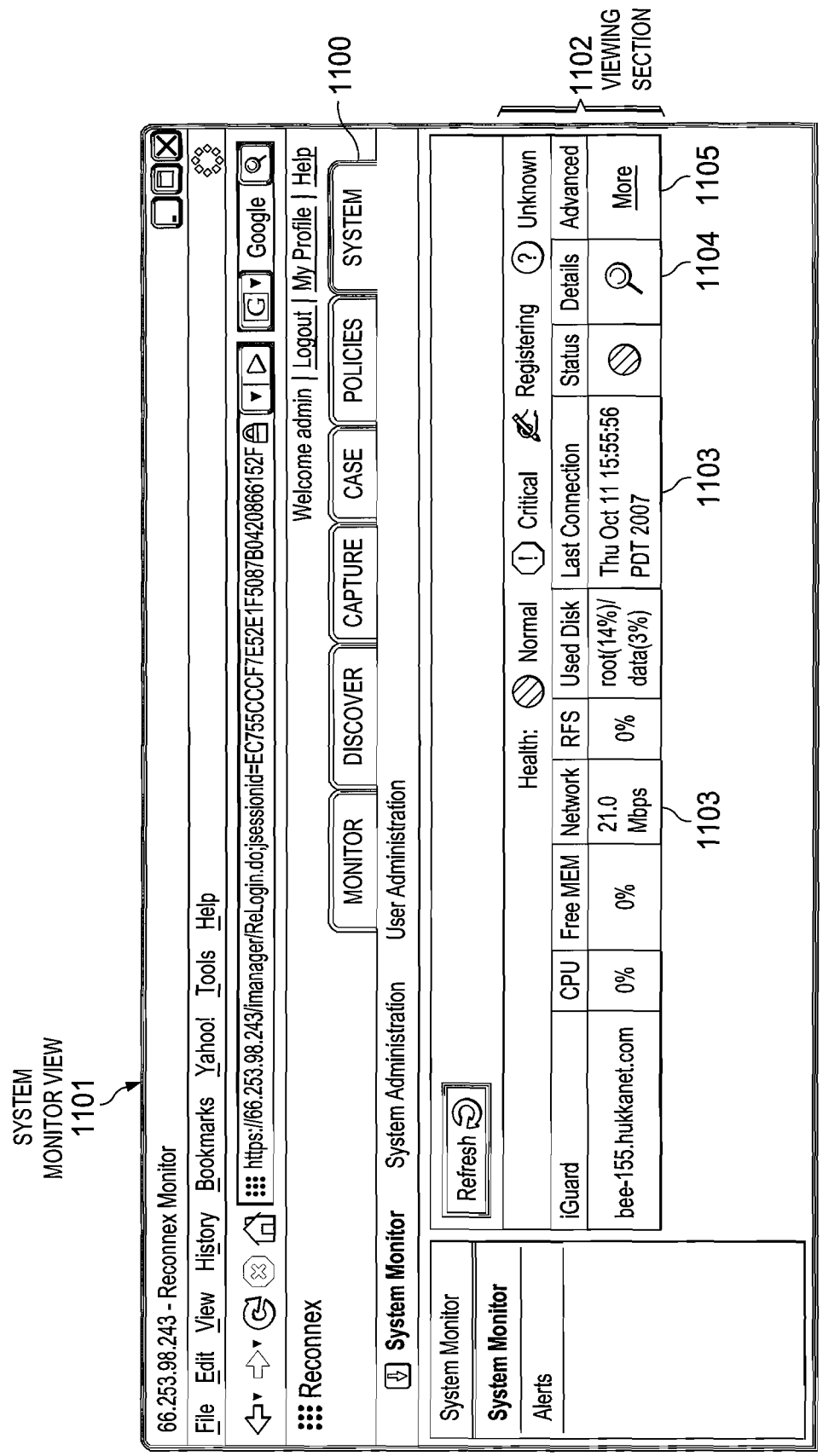
FIG. 11A illustrates one embodiment of a system monitor view.

FIG. 11A illustrates one embodiment of a system monitor view 1101 associated with system tab 1100. System tab 1100 displays user interfaces that assist in system management as described in the following paragraphs. System monitor view 1101 presents an interface, which allows a user to monitor the health of the system. A quick visual summary is presented. In the embodiment shown in FIG. 11A, viewing section 1102 displays the devices that have been added to the system. Attributes 1103 for the devices are displayed, and for the embodiment shown in FIG. 11A, the attributes are displayed as column headings with the corresponding device information listed below. Details 1104 and an advanced tab 1105 are also provided as options for the end user if he wishes to have a more granular view of the activities associated with the iGuard element in this example. Various combinations of attributes may be displayed and the user may customize which attributes are displayed. Examples of attributes include, but are not limited to, the device name, CPU usage, free memory, network speed, system allotment, used disk allotment, last connection date, its status, details trigger, and advanced tools.

In one embodiment, system monitor view 1101 permits the user to view further details about devices. Example details include, but are not limited to: general information such as last connection date, hostname, IP address, process info (e.g., status of slaves, crawler, indexer, profiler, search driver, search results, tcp flow, signature, etc.), uptime, and any patch history information (e.g., build number, release number, etc.); system information such as SYSTEM memory allotment, operating system uptime, operating system version, system CPU and memory usage, and system drives; and network information such as bandwidth speed, average object size, and total objects. In the embodiment shown in FIG. 11A, a details trigger as an attribute that the user can select to display this information.

Figure 11B:
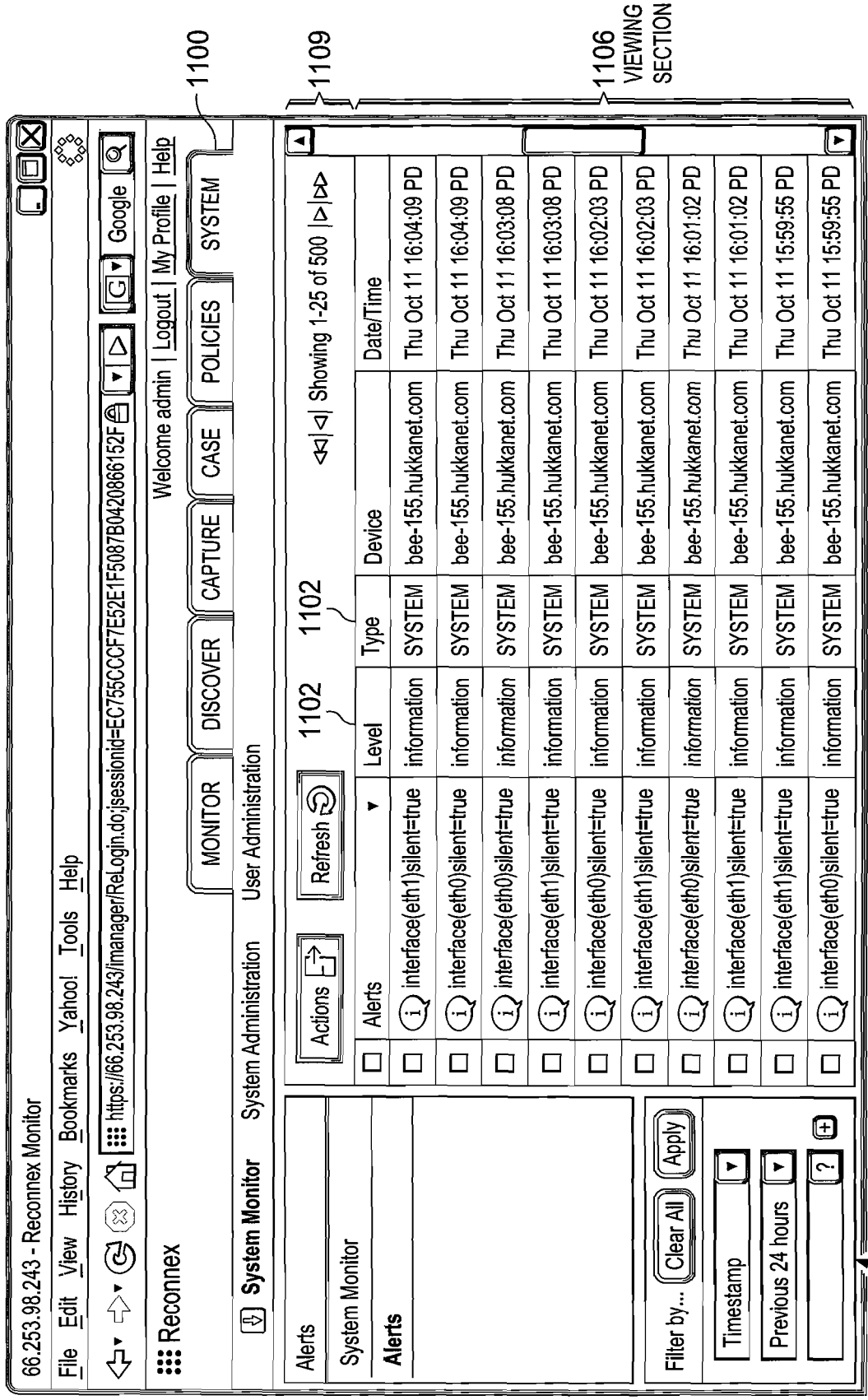
FIG. 11B illustrates one embodiment of a display for displaying alerts.

System monitor view 1101 also presents an interface, which allows a user to view the existing alerts within a system. Alerts are regularly reported to a database and polled periodically. FIG. 11B illustrates one embodiment of a display for displaying alerts. In the embodiment shown in FIG. 11B, viewing section 1106 displays the alerts. Attributes 1107 for the devices are displayed. Various combinations of attributes may be displayed and the user may customize which attributes are displayed. Examples of attributes include, but are not limited to, the alert, its level, type, applicable device, and date/time.

System monitor view 1101 also presents an interface that allows a user to setup and modify alerts. An alert may be setup by entering recipients, their contact information (e.g., email address), and alert types. Many types of alerts may exist and define, for example, when an alert is sent, how often, a priority level, etc. In the embodiment shown in FIG. 11B, actions menu 1109 includes a trigger, which performs this function. In one embodiment, system monitor view 1101 allows a user to filter the alerts by group (e.g., alert level, type, and device) and/or time. In the embodiment shown in FIG. 11B, a filtering section 1108 is displayed and performs this function.

Figure 11C:
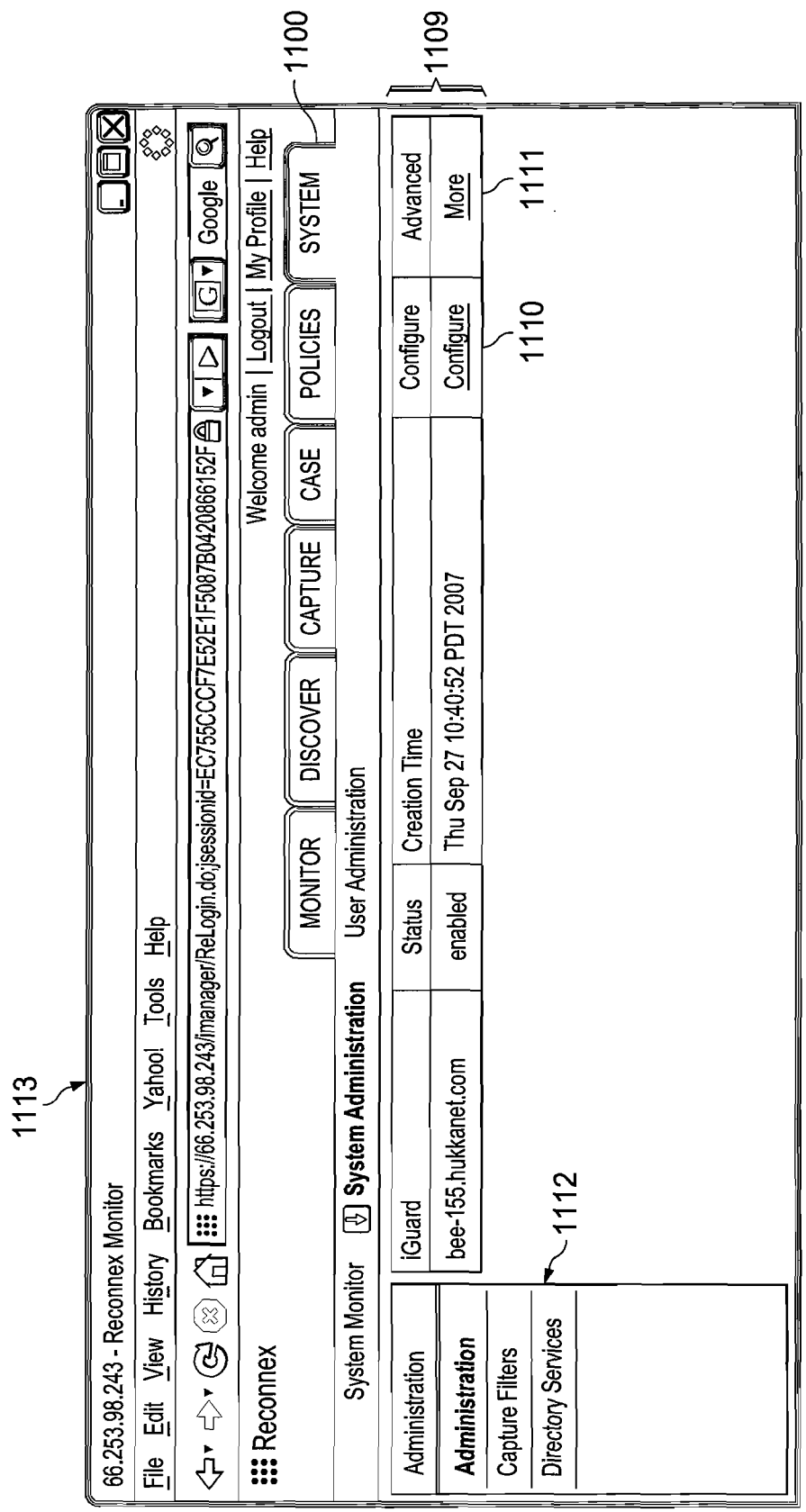
FIG. 11C illustrates one embodiment of a system administration view.

FIG. 11C illustrates one embodiment of a system administration view 1113 associated with system tab 1100. system administration view 1113 presents an interface which, for example, allows a user to: configure devices (e.g., provide network info, DNS info, time info, syslog mode, blocking mode, wiping policy, company info, discover IP, etc.); administer system utilities (e.g., view statistical information for stored objects and flows, view application information, view SYSTEM allotment, view logs, and restart/shutdown triggers); create/edit/manage capture filters (both content and network filters); and manage active directory services (e.g., register and manage LDAP servers). In the example embodiment shown in FIG. 11C, devices are displayed in a viewing section 1109 such that trigger 1110 initiates the display for device configuration and trigger 1111 initiates the display for administering system utilities, and triggers 1112 initiate the display for the other previously mentioned functions.

Capture filters are generally used to define significant portions of network traffic that do not need to be analyzed by the capture engine. Eliminating processing of this extraneous traffic improves system performance. While capture filters screen out classes of information, they can also be used to scan for and store critical data. Content capture filters act on flow of information that is transmitted through the Application layer. These filters can instruct the capture engine to ignore large stores of content, which may not produce any meaningful results. Network capture filters act on Layer-3 transport data that uses up resources but may not need to be recognized by the capture engine. Because this flow carries distinct protocol information, the order in which packets are eliminated may be significant.

Referring back to FIG. 11C, in one embodiment, directory services views include, but are not limited to, a listing of directory services and corresponding attributes, along with triggers to perform various related actions (e.g., creating and/or editing directory servers). Again, various combinations of attributes may be displayed and the user may customize which attributes are displayed. Examples of attributes include, but are not limited to, name, details trigger, server, login DN, and base DN. Upon initiation, these triggers display entry fields for details regarding the LDAP server (e.g., name, description), as well as for parameters defining the action (e.g., element, condition, and value, which may broken up into various categories such as sender/recipient, protocol, date/time, etc.).

Figure 11D:
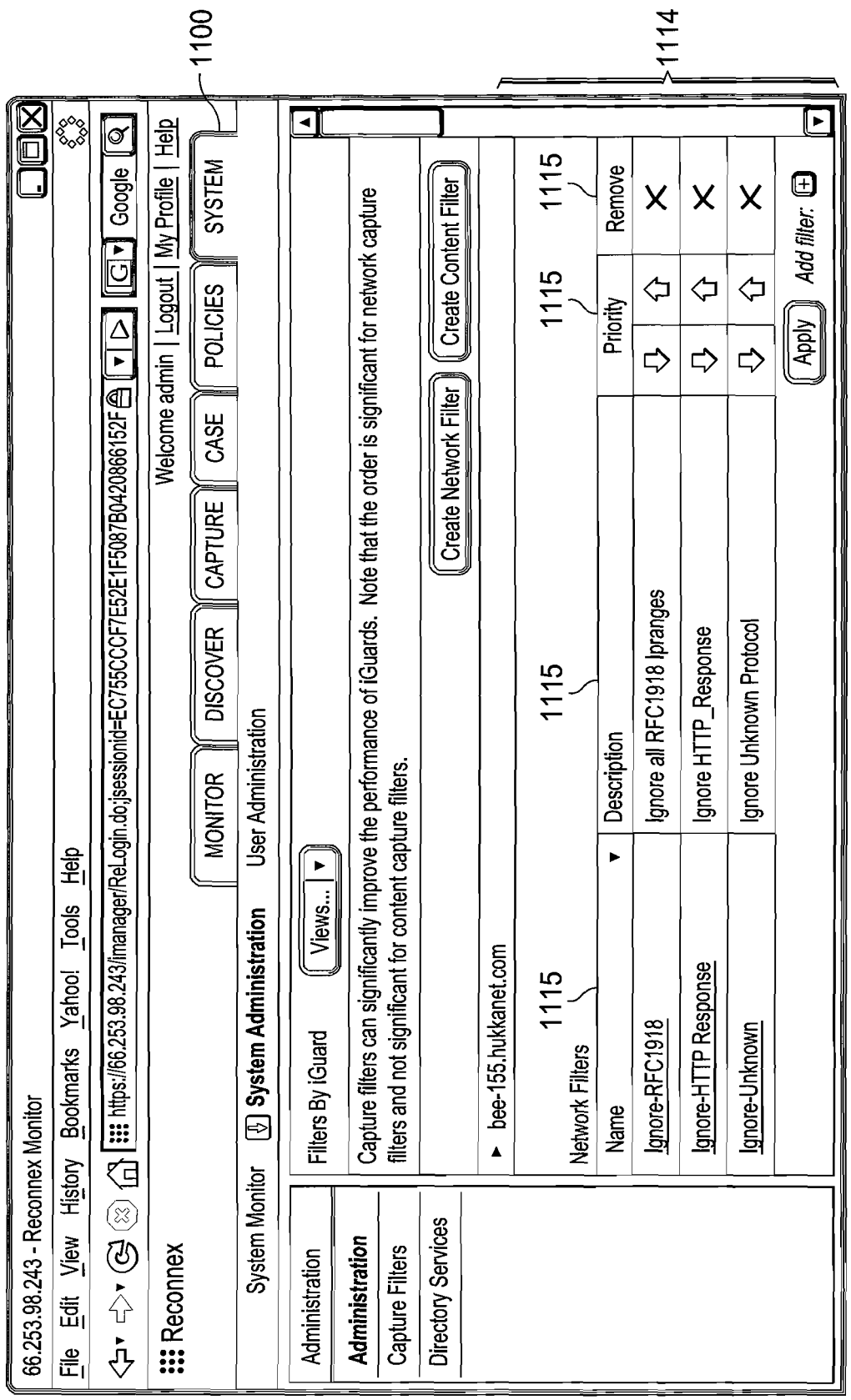
FIG. 11D illustrates one embodiment displaying a capture filters views.

FIG. 11D illustrates one embodiment displaying capture filters, which presents a listing of capture filters 1114 and any attributes 1115 related to the filters, as well as any triggers related to the capture filters (e.g., creating new filters and/or editing existing filters). Upon initiation, these triggers display entry fields for details regarding the capture filter (e.g., name, description), as well as for parameters defining the action (e.g., element, condition, and value, which may broken up into various categories such as sender/recipient, protocol, date/time, etc.).

Figure 11E:
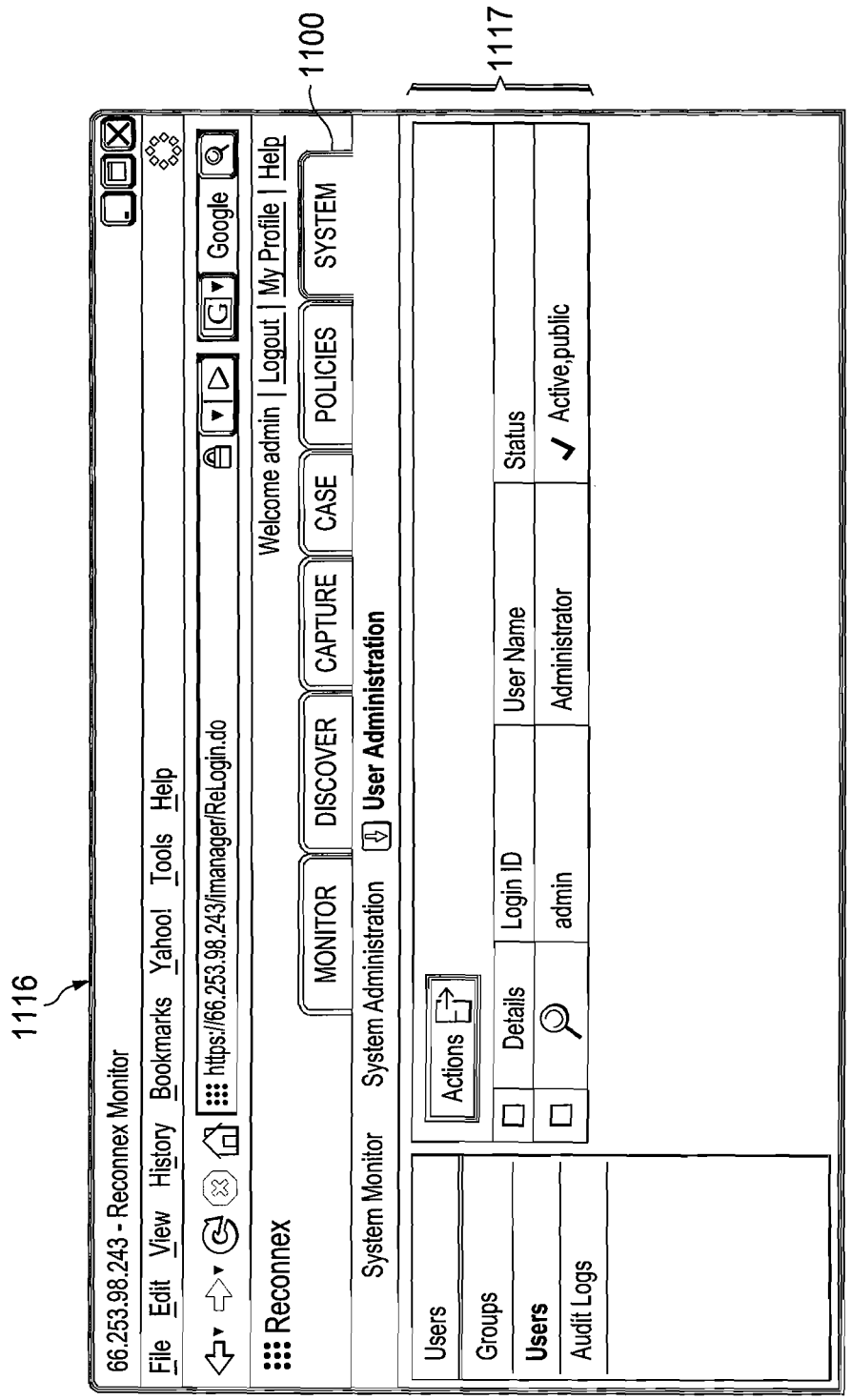
FIG. 11E illustrates one embodiment of a user administration view.

FIG. 11E illustrates one embodiment of a user administration view 1116 associated with system tab 1100. User administration view 1116 presents an interface that, for example, allows a user (e.g., an administrator) to design a user system, create user accounts and groups, and set permissions. For example, a CSO may login as a user and create administrative groups to manage the system (e.g., system administrators, network administrators, installation and setup administrators, policy administrators, etc.). He may also decide that user groups should reflect user roles in existing departments (e.g., engineering users, HR users, marketing users, sales users, etc.). Privileges for each of these groups can then be defined to match departmental functions.

In the example embodiment shown in FIG. 11E, users are displayed in viewing section 1117 along with their attributes. Similarly, groups may be displayed. Again, various combinations of attributes may be displayed and the user may customize which attributes are displayed. Examples of attributes include, but are not limited to, user login ID, user/group name, user/group status, and details trigger. The details trigger may initiate a display for viewing more detailed information about the group/user; for creating new group/users; for viewing/creating/modifying task permissions and/or policy permissions. The embodiment in FIG. 11E also displays a trigger to view audit logs pertaining to the system.

Figure 12A:
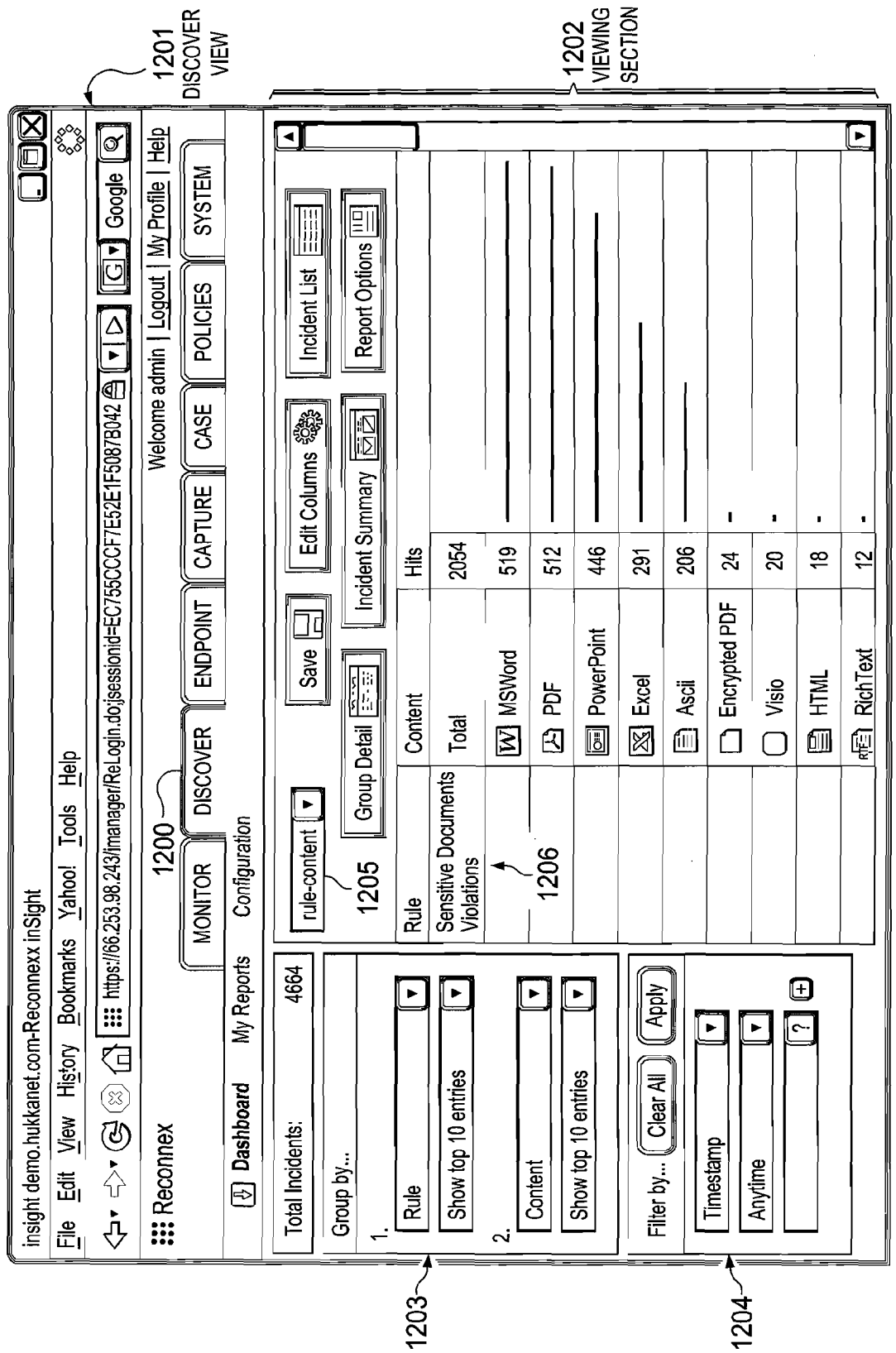
FIGS. 12A-C illustrate an embodiment of a discover view.

FIG. 12A illustrates one embodiment of a discover view 1201 associated with discover tab 1200. Discover tab 1200 presents user interfaces related to scanning data repositories to identify and fingerprint sensitive information to ensure protection of data at rest. In other words, the discovery tab is used to look for objects "at rest" that violate a rule or policy.

The discover view 1201 presents an interface comprising a viewing section 1202 for viewing information associated with incidents. The information presented in viewing section 1202 may be presented in different views, selectable by the user. For instance, a pull down menu 1205 is illustrated in the embodiment shown in FIG. 12A and allows a user to select a default view. The "rule-content" view is illustrated in the example embodiment of FIG. 12A. The incident information is presented in a view that provides the user with a statistical summary of the number of incidents ("hits") for each content type for each rule. For instance, in FIG. 12A, there are a total of 2054 incidents that violate a rule 1206, "Sensitive Documents Violations," of which 519 are of the content type of a MS Word™ document, 512 are of the content type of a PDF, etc. Also shown is the breakdown of the hits in chart form (e.g., displayed as graphical bars). In one embodiment, the incident information may be grouped or filtered by a grouping section 1203 and filtering section 1204, respectively. Grouping section 1203 and filtering section 1204 operate in a similar manner as described for other tabs. In addition to the rule-content view described and shown in FIG. 12A, other views may be presented to display the number of hits for views such as policy-rule, policy-host, rule-host, etc.

Figure 12B:
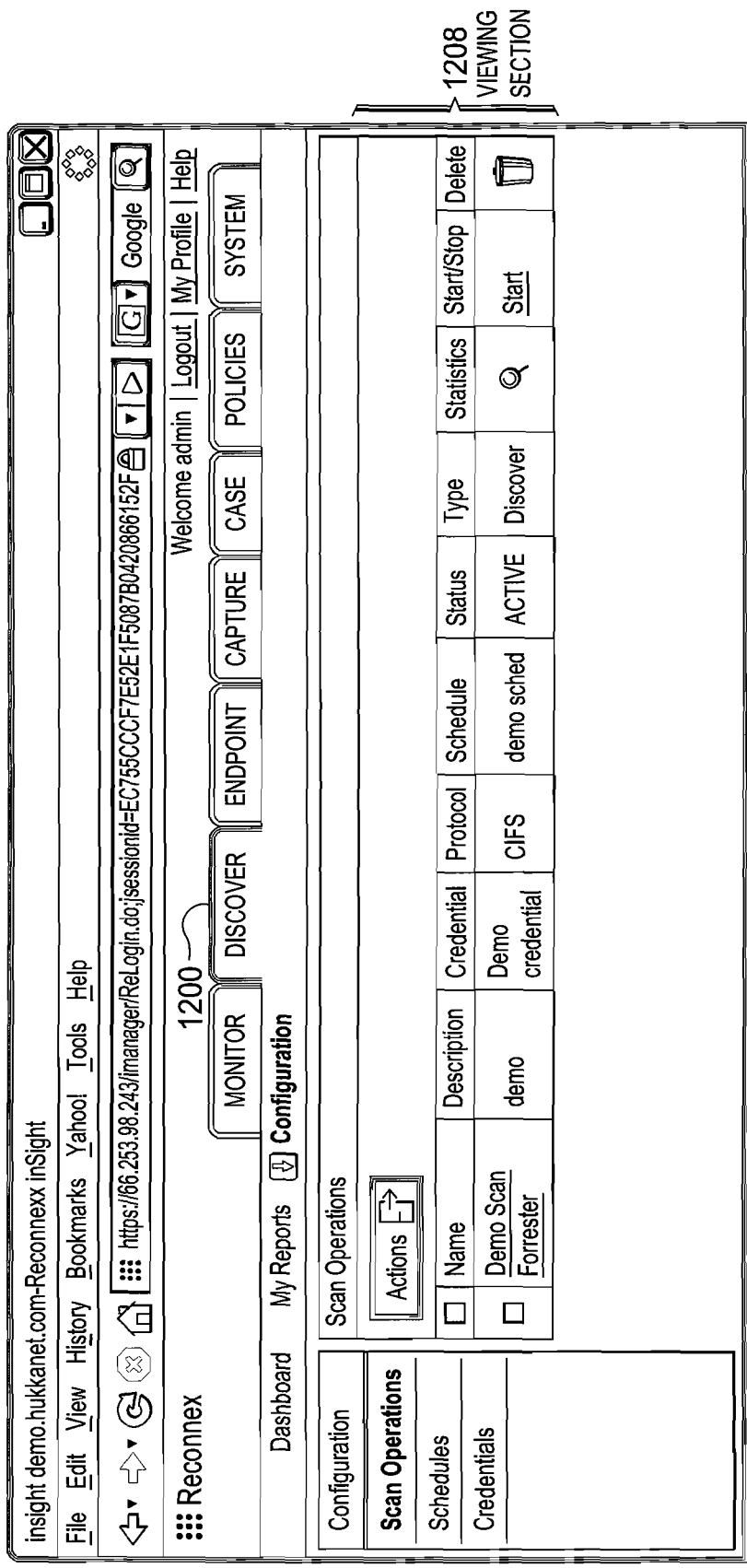

FIG. 12B illustrates one embodiment of a configuration view 1207 that may be triggered from the discover view. Configuration view 1207 presents an interface that allows the user to view existing scans, create, and/or edit scans by defining parameters for scanning the network data, create and/or edit the schedule of when scans are performed. Viewing section 1208 displays a list of existing scans and associated attributes (e.g., the name of the scan, a description of the scan, credential information, protocol, schedule, status, type, a trigger for starting and stopping the scan, and a statistics trigger, which presents statistics pertaining to the scan).

Figure 12C:
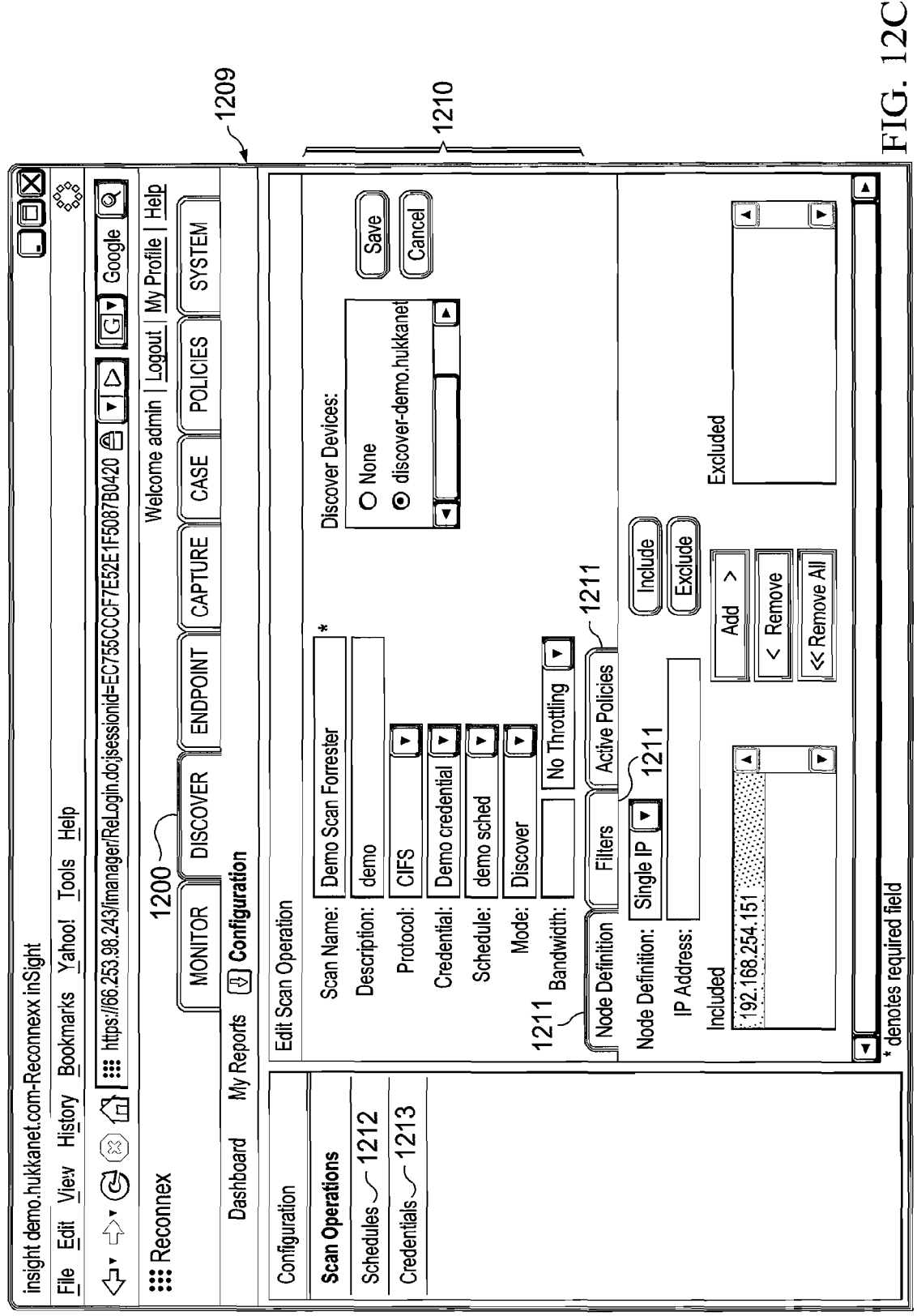

FIG. 12C illustrates one embodiment of a display 1209 (under discover tab 1200), which is presented after initiating a trigger for creating and/or editing a scan. Entry fields 1210 are displayed for entering details of the scan. Example details include, but are not limited to, the scan name, description, protocol, credential, schedule, mode, bandwidth, and relevant devices. In addition, details for defining policies, filters, and nodes for the scan operation may be displayed (e.g., tabs 1211). Triggers 1212, upon initiation, present a display for creating/editing schedules of scans. Here, a user can enter the parameters related to when the scan should be run. Moreover, trigger 1213, upon initiation, presents a display for creating/editing the credentials of scans.

The preceding operational flows have been offered for purposes of example and discussion. Substantial flexibility is provided by the discussed system in that any suitable arrangements, chronologies, configurations, and timing mechanisms may be provided without departing from the teachings of the present invention. Some of these outlined steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably.

In one non-limiting example implementation of one embodiment of the present invention, an article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable medium suitable for storing electronic instructions. In one embodiment, a capture system is an appliance constructed using commonly available computing equipment and storage systems capable of supporting the software requirements.

An article of manufacture (such as a machine-readable medium) may be used to store program code. An article of manufacture that stores program code may be embodied as, but is not limited to, a machine-readable storage medium such as one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)). In one embodiment, a capture system is an appliance constructed using commonly available computing equipment and storage systems capable of supporting the software requirements.

Figure 13:
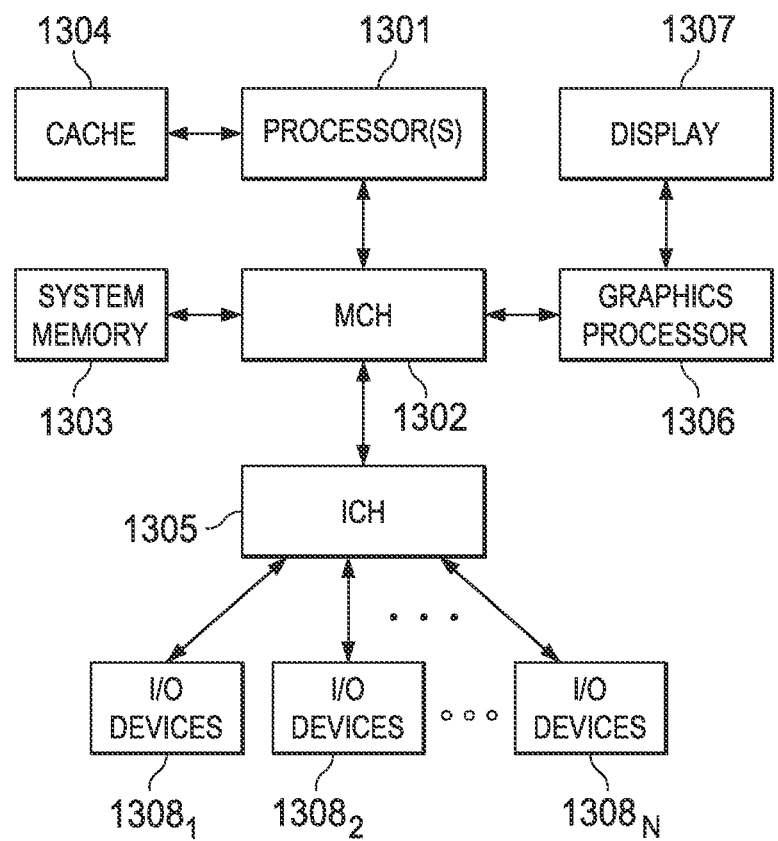
FIG. 13 illustrates one embodiment of a system configuration.

FIG. 13 shows an embodiment of a computing system (e.g., a computer). The example computing system of FIG. 13 includes: 1) one or more processors 1301; 2) a memory control hub (MCH) 1302; 3) a system memory 1303 (of which different types exist such as DDR RAM, EDO RAM, etc,); 4) a cache 1304; 5) an I/O control hub (ICH) 1305; 6) a graphics processor 1306; 7) a display/screen 1307 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 2108.

One or more processors 1301 execute instructions in order to perform whatever software routines the computing system implements. The instructions frequently involve some sort of operation performed upon data. Both data and instructions are stored in system memory 1303 and cache 1304. Cache 1304 is typically designed to have shorter latency times than system memory 1303. For example, cache 1304 might be integrated onto the same silicon chip(s) as the processor(s) and/or constructed with faster SRAM cells, while system memory 1303 might be constructed with slower DRAM cells. By tending to store more frequently used instructions and data in the cache 1304 as opposed to system memory 1303, the overall performance efficiency of the computing system improves.

System memory 1303 is made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1303 prior to their being operated upon by one or more processor(s) 1301 in the implementation of a software program. Similarly, data that a software program determines should be sent from the computing system to an outside entity through one of the computing system interfaces, or stored into an internal storage element, is often temporarily queued in system memory 1303 prior to its being transmitted or stored.

ICH 1305 is responsible for ensuring that such data is properly passed between system memory 1303 and its appropriate corresponding computing system interface (and internal storage device if the computing system is so designed). MCH 1302 is responsible for managing the various contending requests for system memory 1303 access amongst processor(s) 1301, interfaces, and internal storage elements that may proximately arise in time with respect to one another.

One or more I/O devices 1308 are also implemented in a typical computing system. I/O devices generally are responsible for transferring data to and/or from the computing system (e.g., a networking adapter), or for large-scale non-volatile storage within the computing system (e.g., hard disk drive). ICH 1305 has bidirectional point-to-point links between itself and observed I/O devices 1308. A capture program, classification program, a database, a filestore, an analysis engine, and/or a graphical user interface may be stored in a storage device or devices 1308 or in memory 1303.

In the foregoing specification, the invention has been described with reference to specific example embodiments thereof. It will, however, be evident that various modifications and changes may be made thereto without departing from the broader spirit and scope of the invention as set forth in the appended Claims. The specification and drawings are, accordingly, to be regarded in an illustrative rather than a restrictive sense.

Thus, a capture system and a document/content registration system have been described. In the forgoing description, various specific values were given names, such as "objects" and "documents," and various specific modules, such as the "registration module" and "signature database" have been described. However, these names are merely to describe and illustrate various aspects of the present invention, and in no way limit the scope of the present invention. Furthermore, various modules may be implemented as software or hardware modules, combined, or without dividing their functionalities into modules at all. The present invention is not limited to any modular architecture either in software or in hardware, whether described above or not.

What is claimed is:

1. A method, comprising:
   capturing a plurality of packet streams at a host device that is to centrally manage network security for a plurality of client devices to which it is coupled over a network;
   recreating a plurality of flows from the packet streams;
   analyzing the flows to identify one or more incidents, wherein the incidents identify one or more pieces of data, and wherein the packet streams are captured based on capture filters that remove certain network traffic that is not to be analyzed for the incidents; and
   filtering the incidents based on a search request that initiated scanning for the incidents, and wherein at least one search parameter associated with the search request includes word patterns that form a concept for which triggers are provided for performing actions related to the concepts,
   wherein the host device includes a display, which includes a system monitor view that displays details about the client devices including patch history information and an operating system version for each of the client devices, and wherein the system monitor view allows an end user of the host device to view existing alerts that are reported to a database and that are polled periodically,
   wherein the host device includes a case management view that displays particular cases, which are for particular incidents previously discovered during scanning activities, and wherein the case management view allows the end user to assign a priority for the particular cases, to assign an owner to each of the particular cases, and to assign individual responsibility to other users for helping resolve the particular cases.

2. The method of claim 1, wherein the display allows the end user to view a selected one of a group of attributes for the incidents.

3. The method of claim 2, wherein the selected attribute is part of a group of attributes, the group consisting of: content, a source associated with an incident, a destination associated with an incident, a protocol associated with an incident, timestamp associated with an incident, a status of an incident, and a priority of an incident.

4. The method of claim 1, further comprising:
   developing a policy based on the incidents, wherein the policy identifies how one or more data segments are permitted to traverse a network.

5. The method of claim 4, wherein enforcement of the policy includes prohibiting at least one of the data segments from being transmitted over the network.

6. The method of claim 1, wherein the display allows the end user to open a captured object associated with a specific incident.

7. The method of claim 1, wherein the display allows a user to filter the incidents using a selected one of a group of group options, the group of group options consisting of: content, destination IP, destination location, destination port, filename, host IP, host name, policy, protocol, reviewer, rule, sender, severity, source IP, source location, source port, status, user ID, user city, user company, user country, user department, user groups, user email, user manager, user name, user title, and user zip code.

8. The method of claim 1, wherein the display allows the end user to export a report associated with the incidents.

9. The method of claim 1, wherein the display allows the end user to: enter group options for the incidents; and
   view a breakdown of file types of captured objects resulting from grouping the incidents according to the entered group options.

10. The method of claim 1, wherein the incidents are used as a basis for a case that identifies additional details about the incidents, and wherein the display allows the end user to view existing cases and to export the new case and the existing cases to a next destination.

11. The method of claim 1, wherein the display allows the end user to initiate a scan for new incidents, and to view existing scans.

12. The method of claim 11, wherein the display allows the end user to schedule scans.

13. Logic encoded in one or more non-transitory tangible media for execution and when executed by a processor operable to:
   capture a plurality of packet streams at a host device that is to centrally manage network security for a plurality of client devices to which it is coupled over a network;
   recreate a plurality of flows from the packet streams;
   analyze the flows to identify one or more incidents, wherein the incidents identify one or more pieces of data, and wherein the packet streams are captured based on capture filters that remove certain network traffic that is not to be analyzed for the incidents; and
   filter the incidents based on a search request that initiated scanning for the incidents, and wherein at least one search parameter associated with the search request includes word patterns that form a concept for which triggers are provided for performing actions related to the concepts,
   wherein the host device includes a display, which includes a system monitor view that displays details about the client devices including patch history information and an operating system version for each of the client devices, and wherein the system monitor view allows an end user of the host device to view existing alerts that are reported to a database and that are polled periodically, wherein the host device includes a case management view that displays particular cases, which are for particular incidents previously discovered during scanning activities, and wherein the case management view allows the end user to assign a priority for the particular cases, to assign an owner to each of the particular cases, and to assign individual responsibility to other users for helping resolve the particular cases.

14. The media of claim 13, wherein the display allows the end user to view a selected one of a group of attributes for the incidents.

15. The media of claim 14, wherein the selected attribute is part of a group of attributes, the group consisting of: content, a source associated with an incident, a destination associated with an incident, a protocol associated with an incident, timestamp associated with an incident, a status of an incident, and a priority of an incident.

16. The media of claim 13, wherein the code is further operable to: develop a policy based on the incidents, wherein the policy identifies how one or more data segments are permitted to traverse a network.

17. The media of claim 16, wherein enforcement of the policy includes prohibiting at least one of the data segments from being transmitted over the network.

18. The media of claim 13, wherein the display allows the end user to open a captured object associated with a specific incident.

19. The media of claim 13, wherein the display allows a user to filter the incidents using a selected one of a group of group options, the group of group options consisting of: content, destination IP, destination location, destination port, filename, host IP, host name, policy, protocol, reviewer, rule, sender, severity, source IP, source location, source port, status, user ID, user city, user company, user country, user department, user groups, user email, user manager, user name, user title, and user zip code.

20. The media of claim 13, wherein the display allows the end user to export a report associated with the incidents.

21. The media of claim 13, wherein the display allows the end user to: enter group options for the incidents; and
   view a breakdown of file types of captured objects resulting from grouping the incidents according to the entered group options.

22. The media of claim 13, wherein the incidents are used as a basis for a case that identifies additional details about the incidents, and wherein the display allows the end user to view existing cases and to export the new case and the existing cases to a next destination.

23. The media of claim 13, wherein the display allows the end user to initiate a scan for new incidents, and to view existing scans.

24. A host device, comprising:
a processor; and
a memory, wherein the host device is to centrally manage network security for a plurality of client devices to which it is coupled over a network, and wherein the host device is configured for:
   capturing a plurality of packet streams;
   recreating a plurality of flows from the packet streams;
   analyzing the flows to identify one or more incidents, wherein the incidents identify one or more pieces of data, and wherein the packet streams are captured based on capture filters that remove certain network traffic that is not to be analyzed for the incidents; and
   filtering the incidents based on a search request that initiated scanning for the incidents, and wherein at least one search parameter associated with the search request includes word patterns that form a concept for which triggers are provided for performing actions related to the concepts,
wherein the host device includes a display, which includes a system monitor view that displays details about the client devices including patch history information and an operating system version for each of the client devices, and wherein the system monitor view allows an end user of the host device to view existing alerts that are reported to a database and that are polled periodically,
wherein the host device includes a case management view that displays particular cases, which are for particular incidents previously discovered during scanning activities, and wherein the case management view allows the end user to assign a priority for the particular cases, to assign an owner to each of the particular cases, and to assign individual responsibility to other users for helping resolve the particular cases.

* * * * *